(12) United States Patent
Kong et al.

(10) Patent No.: US 7,557,795 B2
(45) Date of Patent: Jul. 7, 2009

(54) INPUT DEVICE USING LASER SELF-MIXING VELOCIMETER

(75) Inventors: Yuan Kong, Kirkland, WA (US); Craig S. Ranta, Redmond, WA (US); Tianpeng Zhao, Hefei (CN); Hai Ming, Hefei (CN); Jianping Xie, Hefei (CN); Jun Xu, Hefei (CN); Deyong He, Hefei (CN)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/170,182

(22) Filed: Jun. 30, 2005

(65) Prior Publication Data

US 2007/0002013 A1    Jan. 4, 2007

(51) Int. Cl.
    *G09G 5/00* (2006.01)
(52) U.S. Cl. .................................. 345/156; 345/166
(58) Field of Classification Search ................ 345/163, 345/165, 166, 156
    See application file for complete search history.

(56) References Cited

U.S. PATENT DOCUMENTS

| | | | |
|---|---|---|---|
| 3,954,335 A | 5/1976 | Bodlaj |
| 4,240,745 A | 12/1980 | Green |
| 4,379,968 A | 4/1983 | Ely et al. |
| 4,417,824 A | 11/1983 | Paterson et al. |
| 4,641,026 A | 2/1987 | Garcia |
| 4,721,385 A | 1/1988 | Jelalian et al. |
| 4,794,384 A | 12/1988 | Jackson |
| 5,114,226 A | 5/1992 | Goodwin et al. |
| 5,125,736 A | 6/1992 | Vaninetti et al. |
| 5,274,361 A | 12/1993 | Snow |
| 5,274,363 A | 12/1993 | Koved et al. |
| 5,369,262 A | 11/1994 | Dvorkis et al. |
| 5,475,401 A | 12/1995 | Verrier et al. |
| 5,510,604 A | 4/1996 | England |

(Continued)

FOREIGN PATENT DOCUMENTS

EP    1107101 A2    6/2001

(Continued)

OTHER PUBLICATIONS

Poujouly et al., Digital Laser Range Finder: Phase-Shift Estimation by Undersampling Technique, 1999, IEEE.*

(Continued)

*Primary Examiner*—Amr Awad
*Assistant Examiner*—Liliana Cerullo
(74) *Attorney, Agent, or Firm*—Merchant & Gould P.C.

(57) ABSTRACT

An input device encodes motion using a laser self-mixing velocimeter. The laser beam is directed at a disk or other moving member. As light from that beam is reflected back into the emitting cavity of the laser, the beam power output fluctuates because of the self-mixing effect and generates a beat signal. The beat signal frequency is used to determine the speed of the member's motion. The direction of motion is also determined based on the beat signal. A difference frequency analog phase locked loop filters the beat signal. A zero-point control disables motion detection when the average beat signal amplitude falls below a threshold. A triangle modulator generates a triangle wave for the laser bias current, with the triangle wave frequency being a submultiple of the beat signal frequency.

9 Claims, 14 Drawing Sheets

U.S. PATENT DOCUMENTS

| | | |
|---|---|---|
| 5,515,045 A | 5/1996 | Tak |
| 5,629,594 A | 5/1997 | Jacobus et al. |
| 5,781,297 A | 7/1998 | Castore |
| 5,808,568 A * | 9/1998 | Wu .............................. 341/20 |
| 5,994,710 A | 11/1999 | Knee et al. |
| 6,015,089 A | 1/2000 | Hecht et al. |
| 6,040,914 A | 3/2000 | Bortz et al. |
| 6,064,702 A * | 5/2000 | Hsien ......................... 375/332 |
| 6,246,482 B1 * | 6/2001 | Kinrot et al. ................ 356/499 |
| 6,300,940 B1 | 10/2001 | Ebina et al. |
| 6,303,924 B1 | 10/2001 | Adan et al. |
| 6,333,735 B1 | 12/2001 | Anvekar |
| 6,373,047 B1 | 4/2002 | Adan et al. |
| 6,489,934 B1 | 12/2002 | Klausner |
| 6,525,677 B1 | 2/2003 | Printzis |
| 6,552,713 B1 | 4/2003 | Van Brocklin et al. |
| 6,585,158 B2 | 7/2003 | Norskog |
| 6,646,723 B1 | 11/2003 | Dubovitsky et al. |
| 6,687,274 B2 | 2/2004 | Kahen |
| 6,707,027 B2 | 3/2004 | Liess et al. |
| 6,868,433 B1 | 3/2005 | Philyaw |
| 6,872,931 B2 | 3/2005 | Liess et al. |
| 6,903,662 B2 | 6/2005 | Rix et al. |
| 7,085,584 B2 | 8/2006 | Shima |
| 7,138,620 B2 | 11/2006 | Trisnadi et al. |
| 7,268,705 B2 | 9/2007 | Kong |
| 7,283,214 B2 | 10/2007 | Xu et al. |
| 7,492,351 B2 * | 2/2009 | VanWiggeren et al. ...... 345/157 |
| 2001/0035861 A1 | 11/2001 | Ericson et al. |
| 2001/0055195 A1 | 12/2001 | Suzuki |
| 2002/0117549 A1 | 8/2002 | Lee |
| 2002/0130183 A1 | 9/2002 | Vinogradov et al. |
| 2002/0158838 A1 | 10/2002 | Smith et al. |
| 2002/0198030 A1 | 12/2002 | Shima |
| 2003/0006367 A1 * | 1/2003 | Liess et al. .................. 250/221 |
| 2003/0085284 A1 | 5/2003 | Bremer et al. |
| 2003/0085878 A1 | 5/2003 | Luo |
| 2003/0128188 A1 | 7/2003 | Wilbrink et al. |
| 2003/0128190 A1 | 7/2003 | Wilbrink et al. |
| 2003/0132914 A1 | 7/2003 | Lee |
| 2003/0136843 A1 | 7/2003 | Ralph et al. |
| 2003/0142288 A1 | 7/2003 | Kinrot et al. |
| 2004/0004128 A1 | 1/2004 | Pettinelli et al. |
| 2004/0004603 A1 | 1/2004 | Gerstner et al. |
| 2004/0075823 A1 | 4/2004 | Lewis et al. |
| 2004/0095323 A1 | 5/2004 | Ahn |
| 2004/0109019 A1 | 6/2004 | Miyamoto et al. |
| 2004/0213311 A1 | 10/2004 | Johnson et al. |
| 2004/0227954 A1 | 11/2004 | Xie |
| 2004/0228377 A1 | 11/2004 | Deng et al. |
| 2004/0246460 A1 | 12/2004 | Auracher et al. |
| 2005/0007343 A1 | 1/2005 | Butzer |
| 2005/0044179 A1 | 2/2005 | Hunter |
| 2005/0068300 A1 | 3/2005 | Wang et al. |
| 2005/0134556 A1 * | 6/2005 | VanWiggeren et al. ...... 345/156 |
| 2005/0156875 A1 | 7/2005 | Kong |
| 2005/0157202 A1 | 7/2005 | Lin et al. |
| 2005/0168445 A1 | 8/2005 | Piot et al. |
| 2005/0179658 A1 | 8/2005 | Huang et al. |
| 2005/0231484 A1 | 10/2005 | Gordon et al. |
| 2005/0243055 A1 | 11/2005 | Ranta et al. |
| 2006/0066576 A1 | 3/2006 | Kong |
| 2006/0213997 A1 | 9/2006 | Frank et al. |
| 2006/0245518 A1 * | 11/2006 | Wang ......................... 375/316 |
| 2006/0262096 A1 | 11/2006 | Panabaker et al. |
| 2007/0102523 A1 | 5/2007 | Kong |
| 2007/0109267 A1 | 5/2007 | Guo et al. |
| 2007/0109268 A1 | 5/2007 | Guo et al. |

FOREIGN PATENT DOCUMENTS

| | | |
|---|---|---|
| GB | 2383231 A | 6/2003 |
| WO | WO 00/28455 | 5/2000 |
| WO | WO2005/055037 | 6/2005 |
| WO | WO 2005/076116 A2 | 8/2005 |

OTHER PUBLICATIONS

T. Bosch, et al., "The Self-Mixing Interference Inside a Laser Diode: Application to Displacement, Velocity and Distance Measurement", Proc. SPIE, vol. 3478, pp. 98-108, Jul. 1998.

Shigenobu Shinohara, et al., "Compact and High-Precision Range Finder with Wide Dynamic Range and its Application", IEEE Transactions on Instrumentation and Measurement, vol. 41, No. 1, pp. 40-44, Feb. 1992.

Roland E. Best, "Phase-Locked Loops, Theory, Design, and Applications", McGraw-Hill Book Company, pp. 151-164, 1984 (15 pages).

H. Yeh, et al., "Localized Fluid Flow Measurements with an He-Ne Laser Spectrometer", Appl. Phys. Lett., vol. 4, No. 10, pp. 176-178, May 15, 1964.

S.W. James, et al., "Fiber Optic Based Reference Beam Laser Doppler Velocimetry", Optics Communications, 119, pp. 460-464, Sep. 15, 1995.

M.J. Rudd, "A New Theoretical Model for the Laser Dopplermeter", J. Phys. E2, pp. 56-58, 1969.

M.J. Rudd, "A Laser Doppler Velocimeter Employing the Laser as a Mixer-Oscillator", J. Phys. E1, Series 2, vol. 1, pp. 723-726, Feb. 21, 1968.

T. Ito, et al., "Integrated Microlaser Doppler Velocimeter", J. Lightwave Tech., vol. 17, No. 1, pp. 30-34, Jan. 1999.

E.T. Shimizu, "Directional Discrimination in the Self-Mixing Type Laser Doppler Velocimeter", Appl. Opt., vol. 25, No. 21, pp. 4541-4544, Nov. 1987.

S.K. Özdemir, et al., "New Speckle Velocimeter Using Two Self-Mixing Laser Diodes", SICE 115C-3, pp. 947-950, Jul. 29-31, 1997.

S.L. Toh, et al., "Whole Field Surface Roughness Measurement by Laser Speckle Correlation Technique", Optics and Laser Technology, 33, pp. 427-434, Jun. 5, 2001.

M. Nagahara, et al., "Real-Time Blood Velocity Measurements in Human Retinal Vein Using the Laser Speckle Phenomenon", Japanese Journal of Ophthalmology, 43, pp. 186-195, 1999.

T. Shibata, et al., "Laser Speckle Velocimeter Using Self-Mixing Laser Diode", IEEE Transactions on Instrumentation and Measurement, vol. 45, No. 2, pp. 499-503, Apr. 2, 1996.

S. Kato, et al., "Optical Fibre Laser Doppler Velocimetry Based on Laser Diode Frequency Modulation", Optical and Laser Technology, vol. 27, No. 4, pp. xii, 1995.

W.H. Stevenson, "Optical Frequency Shifting by means of a Rotating diffraction Grating", Appl. Opt. 9, vol. 9, No. 3, pp. 649-652, Mar. 1970.

M.K. Mazumber, et al., "Laser Doppler Velocity Measurement Without Directional Ambiguity By Using Frequency Shifted Incident Beams", Appl. Phys. Lett., vol. 16, No. 1, pp. 462-464, Jun. 1, 1970.

S. Shinohara, et al., "Laser Doppler Velocimeter Using the Self-Mixing Effect of a Semiconductor Laser Diode", Appl. Opt., vol. 25, No. 9, pp. 1417-1419, 1986.

H.W. Jentink, et al., "Small Laser Doppler Velocimeter Based on the Self-Mixing Effect in a Diode Laser", Appl. Opt. vol. 27, No. 2, pp. 379-385, Jan. 15, 1998.

S. Shinohara, et al., "Acquisition of 3-D Image of Still or Moving Objects Utilizing Laser Diode Range-Finding Speedometer", IEEE, pp. 1730-1735, 1993.

L. Fabiny, et al., "Interferometric Fiber-Optic Doppler Velocimeter with High-Dynamic Range", IEEE Photonics Tech. Lett., vol. 9, No. 1, pp. 79-81, Jan. 1997.

S. Shinohara, et al., "Detection of Mesa Spots and Indents on Slowly Moving Object Surface by Laser-Light Beam Scanning", SICE, 105C-5, pp. 1167-1170, Jul. 26-28, 1995.

Y. Kakiuchi, et al., "Measurement of Small Vibrational Displacement by SM LD Vibrometer with Resonance Element", SICE, 107 A-4, pp. 903-906, Jul. 29-31, 1998.

N. Tsukuda, et al., "New Range-Finding Speedometer Using a Self-Mixing Laser Diode Modulated by Triangular Wave Pulse Current", IEEE, WEAM 4-1, pp. 332-335, May 1994.

H.W. Jentink, et al., "Small Laser Doppler Velocimeter Based on the Self-Mixing Effect in a Diode Laser", Appl. Opt., 27, 2, pp. 379-385, 1998.

Roy Lang, et al., "External Optical Feedback Effects on Semiconductor Injection Laser Properties", IEEE Journal of Quantum Electronics, vol. QE-16, No. 3, pp. 347-355, Mar. 3, 1980.

Acket, G., et al., "The Influence of Feedback Intensity on Longitudinal Mode Properties and Optical Noise in Index-Guided Semiconductor Lasers", IEEE Journal of Quantum Electronics, vol. QE-20, No. 10, pp. 1163-1169, Oct. 1984.

P.J. de Groot, et al., "Ranging and Velocimetry Signal Generation in a Backscatter-Modulated Laser Diode", Appl. Opt., vol. 27, No. 21, pp. 4475-4480, Nov. 1988.

P.A. Porta, "Laser Doppler Velocimetry by Optical Self-Mixing in Vertical-Cavity Surface-Emitting Lasers", IEEE Photonics Technology Letters, vol. 14, No. 12, pp. 1719-1721, Dec. 2002.

S.K. Özdemir, et al., "Effect of Linewidth Enhancement Factor on Doppler Beat Waveform Obtained From a Self-Mixing Laser Diode", Optical Review, vol. 7, No. 6, pp. 550-554, Jun. 22, 2000.

S. Shinohara, et al., "Compact and Versatile Self-Mixing Type Semiconductor Laser Doppler Velocimeters with Direction-Discrimination Circuit", IEEE Transactions on Instrumentation and Measurement, vol. 38, No. 2, pp. 574-577, Apr. 1989.

James H. Chumside, "Laser Doppler Velocimetry by Modulating a $CO_2$ Laser with Backscattered Light", Appl. Opt., vol. 23, No. 1, pp. 61-66, Jan. 1984.

M.H. Koelink, et al., "Laser Doppler Velocimeter Based on the Self-Mixing Effect in a Fiber-Coupled Semiconductor Laser: Theory", Appl. Opt., vol. 31, No. 18, pp. 3401-3408, Jun. 20, 1992.

W.M. Wang, et al., "Self-Mixing Interference in a Diode Laser: Experimental Observations and Theoretical Analysis", Appl. Opt., vol. 32, No. 9, pp. 1551-1558, Mar. 20, 1993.

Guido Giuliani, et al., "Laser Diode Self-Mixing Technique for Sensing Applications", J. Opt. A: Pure Appl. Opt, 4, vol. 4, No. 6, pp. S283-S294, Nov. 4, 2002.

Richard C. Addy, et al., "Effects of External Reflector Alignment in Sensing Applications of Optical Feedback in Laser Diodes", IEEE Journal of Lightwave Technology, December, vol. 14, No. 12, pp. 2672-2676, Dec. 1996.

S.F. Yu, "Theoretical Analysis of Polarization Bistability in Vertical Cavity Surface Emitting Semiconductor Lasers", IEEE Journal of Lightwave Technology, vol. 15, No. 6, pp. 1032-1041, Jun. 1997.

F. Robert, et al., "Polarization Modulation Dynamics of Vertical-Cavity Surface-Emitting Lasers with an Extended Cavity", IEEE Journal of Quantum Electronics, vol. 33, No. 12, 2231-2239, Dec. 1997.

J. Danckaert, et al., "Minimal Rate Equations Describing Polarization Switching in Vertical-Cavity Surface-Emitting Lasers", Optics Communications, vol. 201, pp. 129-137, Jan. 2002.

J. Martin-Regalado, et al., "Polarization Properties of Vertical-Cavity Surface-Emitting Lasers", IEEE Journal of Quantum Electronics, vol. 33, No. 5, pp. 765-783, May 1997.

S. Donati, et al., "Laser Diode Feedback Interferometer for Measurement of Displacements Without Ambiguity", IEEE Journal of Quantum Electronics, vol. 31, No. 1, pp. 113-119, Jan. 1995.

K. Petermann, et al., "External Optical Feedback Phenomena in Semiconductor Lasers", IEEE Journal of Selected Topics in Quantum Electronics, vol. 1, No. 2, pp. 480-489, Jun. 1995.

Wu, Qingguang, et al., "New Vibrometer Using Self-Mixing Laser Diode Modulated with Triangular Current", Shizuoka University, Cleo/Pacific Rim/, pp. 290-291, 1997.

Besnard, Pascal, et al., "Microwave Spectra in External-Cavity Semiconductor Lasers: Theoretical Modeling of Multipass Resonances", IEEE Journal of Quantum Electronics, pp. 1713-1722, (Aug. 1994) vol. 30, No. 8.

Besnard, Pascal, et al., "Feedback Phenomena in a Semiconductor Laser Induced by Distant Reflectors", IEEE Journal of Quantum Electronics, pp. 1271-1284, (May 1993) vol. 29, No. 5.

Short Talk: Fitt's Law & Text Input, New Horizons, "Interface with Pre-Typing Visual Feedback for Touch Sensitive Keyboard", p. 750-751, CHI Apr. 5, 2003.

Bazin, G., et al., "A New Laser Range-Finder Based on FMCW-Like Method", IEEE Instrumentation and Measurement Technology Conference, (1996), pp. 90-93, Jun. 4, 1996.

Peng, Gang, et al., "Design of 3-D Mouse Using Ultrasonic Distance Measurement", International Conference on Sensors and Control Techniques, pp. 226-229, (2000), Proceedings of SPIE, vol. 4077.

Shinohara, Shigenobu, et al., "High-Resolution Range Finder with Wide Dynamic Range of 0.2m to 1m Using a Frequency-Modulated Laser Diode", pp. 646-651, (1989), IEEE.

Bosch, Thierry, et al., "Three-Dimensional Object Construction Using a Self-Mixing Type Scanning Laser Range Finder", pp. 1326-1329, (1998), IEEE Transactions on Instrumentation and Measurement, vol. 47, No. 5, Oct. 1998.

Dorsch, Rainer G., et al., "Laser Triangulation: Fundamental Uncertainty in Distance Measurement", pp. 1306-1314, (1994), Applied Optics, vol. 33, No. 7, Mar. 1, 1994.

Dupuy, D., et al., "A FMCW Laser Range-Finder Based on a Delay Line Technique", pp. 1084-1088, (2001), IEEE Instrumentation and Measurement Technology Conference, May 21, 2001.

Journet, B., et al., "High Resolution Laser Range-Finder Based on Phase-Shift Measurement Method", pp. 123-132, (1998), SPIE vol. 3520, Nov. 1998.

Favre-Bulle, Bernard, et al., "Efficient Tracking of 3D—Robot Positions by Dynamic Triangulation", pp. 446-449, (1998), IEEE IMTC Session on Instrumentation and Measurement in Robotics, May 18, 1998.

Bosch, T., et al., "A Low Cost, Optical Feedback Laser Range-Finder with Chirp Control", (2001), IEEE Instrumentation and Measurement Technology Conference, May 21, 2001, (4 pages).

Tucker, John, "Laser Range Finder Using the Self-Mixing Effect in a Vertical Cavity Surface Emitting Laser", (VCSEL), pp. 1-71, Oct. 19, 2001.

deGroot, Peter, et al., "Chirped Synthetic-Wavelength Interferometry", pp. 1626-1628, (1992), Optics Letters, vol. 17, No. 22, Nov. 15, 1992.

Gelmini, E., et al., "Tunable, Double-Wavelength Heterodyne Detection Interferometer for Absolute-Distance Measurements", pp. 213-215 (1994), Optics Letters, vol. 19, No. 3, Feb. 1, 1994.

IBM Technical Disclosure Bulletin, "Ultrasonic Cursor Position Detection", pp. 6712-6714, vol. 27, No. 11, Apr. 1985.

Tucker, J.R., et al., "Laser Range Finding Using the Self-Mixing Effect in a Vertical-Cavity Surface-Emitting Laser", pp. 583-586, (2002), Conference on Optoelectronic and Microelectronic Materials and Devices.

Journet, B., et al., "A Low-Cost Laser Range Finder Based on an FMCW-Like Method", pp. 840-843, (2000), IEEE Transactions on Instrumentation and Measurement, vol. 49, No. 4, Aug. 2000.

Marques, Lino, et al., "3D Laser-Based Sensor for Robotics", pp. 1328-1331, (1994), ISR—Institute of Systems and Robotics.

Marques, Lino, et al., "A New 3D Optical Triangulation Sensor for Robotics", pp. 512-517, (1998), IEEE International Workshop on Advanced Motion Control.

Preucil, Libor, "Building a 2D Environment Map From Laser Range-Finder Data", pp. 290-295, (2000), IEEE Intelligent Vehicles Symposium; Oct. 3, 2000.

Nyland Lars S., et al., "Capturing, Processing and Rendering Real-World Scenes", IEEE, 2001, (9 pages).

Onodera, Ribun, et al., "Effect of Laser-Diode Power Change on Optical Heterodyne Interferometry", pp. 675-681, (1995), Journal of Lightwave Technology, vol. 13, No. 4, Apr. 1995.

Besesty, Pascal, et al., "Compact FMCW Advanced Laser Range Finder", pp. 552-553, (1999) Technical Digest: Conference on Lasers and Electro-Optics.

Poujouly, Stephane, et al., "Digital Laser Range Finder: Phase-Shift Estimation by Undersampling Technique", pp. 1312-1317, (1999), IEEE.

Zheng, Jiang Yu, "A Flexible Laser Range Sensor Based on Spatial-Temporal Analysis", (2000), Proceedings of the International Conference on Pattern Recognition, (ICPR), (4 pages).

Dandliker, R., et al., "Two-Wavelength Laser Interferometry Using Superheterodyne Detection", pp. 339-341, Optics Letters, (1998) vol. 13, No. 5, May 1998.

Zou, Q., et al., "Silicon Capacitive Microphones with Corrugated Diaphragms", School of Mechanical and Production Engineering, Nanyang Technological University; dated of first publication unknown, but believed to be prior to Sep. 30, 2003, (4 pages).

Rombach, Pirmin, et al., "A Low-Voltage Silicon Condensor Microphone for Hearing Instrument Applications", Microtronic A/S; date of first publication unknown, but believed to be prior to Sep. 30, 2003, (4 pages).

Shinoda, Yukitaka, et al., "Real-Time Computation of Distance and Displacement by Software Instruments Using Optical Frequency Modulation", pp. 82-83, (2002), SICE, Aug. 5, 2002.

Cole, Timothy A., et al., "Flight Characterization of the Near Laser Rangefinder", pp. 131-142, (2000), Laser Radar Technology and Applications V, Proceedings of SPIE vol. 4035.

Viarani, Luigi, et al., "A CMOS Smart Pixel for Active 3-D Vision Applications", pp. 145-152, IEEE Sensors Journal, vol. 4, No. 1, Feb. 2004.

Wakitana, Jun, et al., "Wrist-Mounted Laser Rangefinder", pp. 362-367, (1995) Proceedings of the International Conference on Intelligent Robots and Systems.

Zahid, M., et al., "High-Frequency Phase Measurement for Optical Rangefinding System", pp. 141-148, IEEE Proceedings Science and Measurement Technology, vol. 144, No. 3, May 1997.

Whetstone, Albert, "Free-Hand Data Input", pp. 11-28, Science Accessories Corporation (1970).

Acroname Articles, Demystifying the Sharp IR Rangers, <http://www.acroname.com/robotics/info/articles/sharp/sharp.html> date of first publication unknown, but believed to be prior to Sep. 20, 2004, (9pages).

Gagnon, Eric, "Laser Range Imaging Using the Self-Mixing Effect in a Laser Diode", pp. 693-699, (1999), IEEE Transactions on Instrumentation and Measurement, vol. 48, No. 3, Jun. 1999.

Canesta, Inc., "Data Input Alternatives for Mobile Devices", pp. 1-5, Nov. 28, 2002.

Steinmetz, Robert, et al., "Solving the Data Input Problem in Mobile Devices", pp. 1-6, Sep. 2002.

Tomasi, Carlo et al., "Full-Size Projection Keyboard for Handheld Devices", pp. 70-75, Communications of the ACM, vol. 46, No. 7, Jul. 2003.

Hebert, Martial, "Active and Passive Range Sensing for Robotics", pp. 102-110, IEEE International Conference of Robotics and Automation, Apr. 2000.

"Laser-Based Tracking for Real-Time 3D Gesture Acquisition", <http://www.k2.t.u-tokyo.ac.jp/fusion/LaserActiveTracking/index-e.html>; first date of publication unknown, but believed to be prior to Aug. 4, 2004, (9 pages).

Aeroflex Mixed-Signal Asics, "Choosing an Ultrasonic Sensor for Proximity or Distance Measurement", Part 1: Acoustic Considerations <http://www.sensorsmag.com/articles/0299/acou0299/main.shtml>; date of first publication unknown, but believed to be Feb. 1999, (8 pages).

Aeroflex Mixed-Signal Asics, "Choosing an Ultrasonic Sensor for Proximity or Distance Measurement", Part 2: Optimizing Sensor Selection <http://www.sensorsmag.com/articles/0399/0399_28/main.shtml>; date of first publication unknown, but believed to be Mar. 1999, (13 pages).

Canesta Keyboard, <http://www.canesta.com/canestakeyboard.htm>; date of first publication unknown, but believed to be prior to Aug. 3, 2004, (2 pages).

Canesta Keyboard, <http://www.canesta.com/faq.htm>; date of first publication unknown, but believed to be prior to Aug. 3, 2004, (6 pages).

W.M. Wang, et al., "Self-Mixing Interference Inside a Single-Mode Diode Laser for Optical Sensing Applications", Journal of Lightwave Technology, vol. 12, No. 9, pp. 1577-1587, Sep. 1994.

Özdemir, Sahin Kaya, et al., "Velocity Measurement by a Self-Mixing Laser Diode Using Speckle Correlation", IEEE, pp. 1756-1760, 1999.

"Optical Mouse Saves Space", <http://www.optics.org/articles/news/8/6/23/1>, date of first publication unknown, but believed to be Jun. 26, 2002.

Hewett, Jacqueline, "Holey VCSELs Produce High Powers", <http://www.optics.org/articles/news/10/12/5/1>, date of first publication unknown, but dated Dec. 2004; 2 pages.

"Ultra-miniature Laser Displacement Sensors", <http://www.globalspec.com/FeaturedProducts/Detail/BaumerElectric/Ultraminiature_Laser_Displacement_Sensors/13470/1>, first date of publication unknown, but prior to Sep. 12, 2005, 2 pages.

Nerin, P., et al., "Absolute Distance and Velocity Measurements by the FMCW Technique and Self-Mixing Interference Effect Inside a Single-Mode Nd:YAG-LiTAO$_3$ Microchip Laser", Journal of Optics, vol. 29, No. 3, Jun. 1998.

Lowery, James, et al., "Design and Simulation of a Simple Laser Rangefinder Using a Semiconductor Optical Amplifier-Detector", Optics Express, vol. 13, No. 10, May 16, 2005; pp. 3647-3652.

Maier, T., et al., "A Compact Sensor for Interferometric Displacement Measurements", <http://www.fke.tuwien.ac.at/Publications/jb/fdjb99/tm.htm>, first date of publication unknown, but dated 1999, 2 pages.

"Laser Sensors Offer Long Stand-off and Measurement Range", ThomasNet Industrial news Room, <http://www.news.thomasnet.com/fullstory/458005/1782>, date of first publication unknown, but dated Dec. 3, 2004, 5 pages.

Shaked, Doron, et al., "Graphical Indicia", 2.2 Barcode-Reading Sub-System, <http://www.hpl.hp.com/research/isl/vsb/GraphIndicialCIP.pdf>, first date of publication unknown but, on or before Oct. 13, 2005, 4 pages.

Tsaur, Jiunnjye, et al., "2D Micro Scanner Actuated by Sol-gel Derived Double Layered PZT", National Institute of Advanced Industrial Science and Technology (AIST), <http://toshi.fujita3.iis.u-tokyo.ac.jp/Optical_MEMS_Archives/MEMS%202002/Book/135.PDF>, first date of publication unknown, but on or before 2002, pp. 548-551.

Sasaki, Minoru, et al., "Optical Scanner on a Three-Dimensional Microoptical Bench", Journal of Lightwave Technology, vol. 21, Issue 3, 602, Mar. 2003, <http://jlt.osa.org/abstract.cfm?id=72540>, 1 page.

Liess, Martin, et al., "A Miniaturized Multidirectional Optical Motion Sensor and Input Device Based on Laser Self-Mixing", Meas. Sci. Technol. 13, 2001-2006; <http://www.iop.org/EJ/abstract/0957-0233/13/12/327>, Nov. 1, 2002; Issue 12; 2 pages.

Gokturk, S. Burak, et al., "A Time-Of-Flight Depth Sensor—System Description, Issues and Solutions," *cvprw*, p. 35, 2004 Conference on Computer Vision and Pattern Recognition Workshop (CVPRW'04), vol. 3, 2004, 9 pages.

"How Does 3DV's Technology Work?", <http://www.3dvsystems.com/technology/technology.html>, first date of publication unknown but on or before Oct. 13, 2005, 7 pages.

Gokturk, Salih Burak, et al., "3D Head Tracking Based on Recognition and Interpolation Using a Time-of-Flight Depth Sensor," *cvpr*, pp. 211-217, 2004 IEEE Computer Society Conference on Computer Vision and Pattern Recognition (CVPR'04)—vol. 2, 2004, 7 pages.

D. Dupuy, et al., "Improvement of the FMCW Laser Range-Finder by an APD Working as an Optoelectronic Mixer," IEEE Transactions on Instrumentation and Measurement, 51, 5, pp. 1010-1014, 2002.

R.P. Griffiths, et al., "Cavity-Resonant Optical Position Sensor- a New Type of Optical Position Sensor," p. 328, CLEO, 1998.

Logitech® G7 Laser Cordless Mouse; <http://www.logitech.com/index.cfm/products/details/US/EN,CRID=2135,CONTENTID=10716>; date of first publication unknown, but on or before Oct. 24, 2005; 3 pages.

Logitech® MX™ 1000 Laser Cordless Mouse; <http://www.logitech.com/index.cfm/products/details/US/EN,CRID=3,CONTENTID=9043,a d=g03&srch=1>; date of first publication unknown, but on or before Oct. 24, 2005; 3 pages.

5-Button USB Laser Mouse; <http://www.iogear.com/main.php?loc=product&Item=GME521>; date of first publication unknown, but on or before Oct. 24, 2005; 3 pages.

Houghton, Andrew, et al., "A Method for Processing Laser Speckle Images to Extract High-Resolution Motion" pp. 611-617, Meas. Sci. Technol. 8 (1997), published Feb. 24, 1997.

Yamaguchi, Ichirou, et al., "Stabilized and Accelerated Speckle Strain Gauge", SPIE Conference on Laser Interferometry: Quantitative Analysis of Interferograms: Third in a Series, Aug. 1989; published Sep. 22, 1991; 8 pages.

Taka, Nobukatsu, et al., Displacement Measurement of Speckles Using a 2-D Level-cross Technique, Applied Optics, vol. 22, No. 22, published Nov. 15, 1983; pp. 3514-3519.

Nokia 7110 Phone Features, www.nokia.com/nokia/0,87643598,00.html, Aug. 23, 2005, 3 pp.

Sony Ericsson Mobile Communications-Home Page-Sony Ericsson-T206, www//sonyericsson.co/spg.jspcc=global&lc=en=&ver=4001&template=ps1_1_5_4&zone=ps&Im=ps1_1&pid=9946, Aug. 23, 2005, 2 pp.

* cited by examiner

FIG. 1
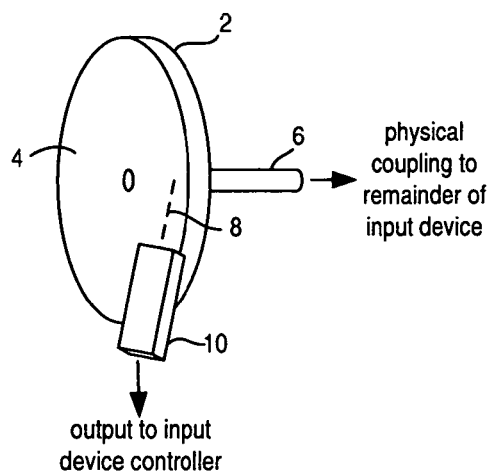
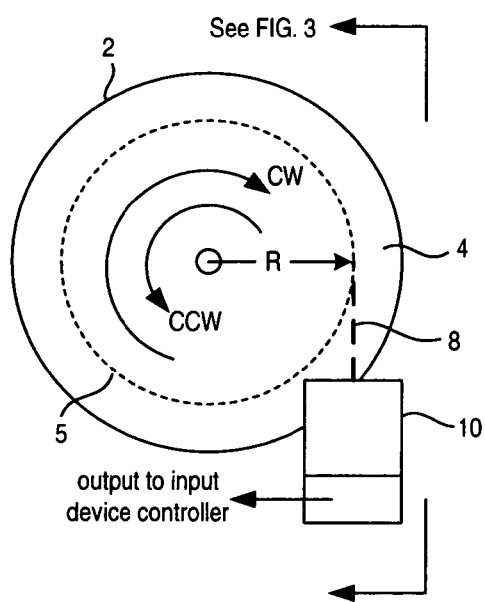
FIG. 2
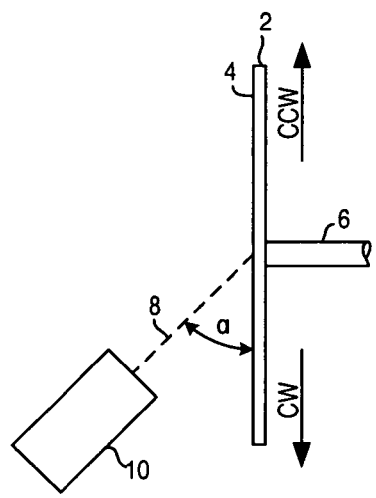
FIG. 3

INPUT DEVICE USING LASER SELF-MIXING VELOCIMETER

BACKGROUND

Many types of input devices rely on measuring rotation or other movement of a knob, a dial or some other type of element which a human user can manipulate. A scroll wheel on a computer mouse is a familiar example of such a control. However, numerous other types of input controls also measure rotational and linear movement. For example, a trackball measures both the direction and amount that a user-movable ball is rotated about X and Y axes. A joystick measures the direction and amount by which a stick is pivoted about its base. A dial (e.g., a volume control dial) measures the amount by which a user has rotated that dial, as well as the direction of rotation. A mouse typically measures the direction and amount of motion along two orthogonal axes.

Movement-sensing controls convert the rotational or linear movement of a physical component into some type of signal. Existing controls perform this conversion (also known as encoding) in a variety of ways. Some controls rely on a potentiometer coupled to the moving element. Rotation or other movement of the element causes a corresponding increase or decrease in the electrical resistance of the potentiometer. That resistance is then used as a measure of the element's movement. Although potentiometers have advantages (e.g., low cost, ease of implementation), they can also generate noise and suffer from performance degradation as the potentiometer wears. Potentiometers may have limited accuracy, and may not be suitable where very precise measurement is required. Potentiometers are also not suitable for endlessly rotatable input controls such as mouse scroll wheels.

Another type of encoder uses a light source (e.g., an LED) and a light detector on opposite sides of an encoding wheel having alternating regions which block passage of light. The encoding wheel may be directly manipulated by the user or coupled to some other element which the user moves. As the encoding wheel turns, light from the LED is alternately received and then blocked from the light detector. The light detector output is then used to measure the amount by which the encoding wheel has rotated. These types of encoders can be used in an endlessly rotatable control, and have numerous other advantages. However, the precision of these encoders may also be limited. Moreover, these encoders usually require that two separate elements (the LED and the receptor) be aligned.

Optical imaging is another mechanism used for encoding motion. Typically, an LED or other light source illuminates a tracking surface (e.g., a desktop over which a mouse moves, a trackball outer surface, etc.). An imaging array is then used to capture an image of a portion of the tracking surface. Successive images are then correlated and used to determine direction and/or speed and/or amount of tracking surface movement. Although optical imaging represents a substantial advance in motion encoding, cost concerns may limit the resolution of imaging arrays used for motion encoding. There may also be limits upon the types of surfaces which a given imager may be able to track.

Laser Doppler velocimetry has been used in instrumentation applications such as measuring fluid flow, particle velocity and speeds of moving objects. One potential method of laser Doppler velocimetry makes use of the "self-mixing" effect. As is known in the art, the intensity of a laser's output will change if a portion of that laser's beam is reflected back into the laser's emitting cavity and mixes with the light being generated in the emitting cavity. The change in the laser's output intensity is a function of, e.g., the roundtrip delay between the time that light leaves the laser and the time that the light is reflected back into the emitting cavity. If the laser's beam is reflecting from a moving target back into its emitting cavity, the laser's power output will vary in a periodic manner. These power fluctuations, or "beats," have a frequency which corresponds to the Doppler shift associated with movement of the reflecting target away from (or toward) the laser. Laser Doppler velocimetry can be very accurate and repeatable. However, the cost and complexity of laser Doppler velocimetry systems has remained high. For at least these reasons, such systems have not been used with computer or other types of low cost input devices.

SUMMARY

In at least some embodiments, a rotational input device encodes direction and speed of rotation using a laser self-mixing velocimeter. In certain of these embodiments, a laser beam is directed on a disk or other rotatable member. As light from that beam is reflected back into the emitting cavity of the laser, the beam power output fluctuates because of the self-mixing effect. These fluctuations are then measured and used to determine the speed of rotation. The rotational speed can then be converted into a measure of the amount of rotation. In some embodiments, the direction of rotation is also determined based on waveforms in the laser output.

In other embodiments, a laser self-mixing velocimeter is used to encode linear motion. This linear motion may, e.g., be motion of a computer mouse along two or more axes in the plane of a desktop or other surface across which the mouse is moved. In still other embodiments, this linear motion may be the movement of a finger or other body part across a tracking window through which beams of one or more laser self-mixing velocimeters are shined.

In yet other embodiments, a laser self-mixing velocimetry system includes a phase locked loop (PLL) which mixes a signal from a laser sensor with a reference frequency. In still further embodiments, a laser self-mixing velocimetry system includes a zero point control to reduce erroneous tracking readings at very low speeds. In additional embodiments, a laser self-mixing velocimetry system includes a bias current modulator which tracks the Doppler shift output by the laser sensor.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows an arrangement of certain components of an input device according to some illustrative embodiments.

FIG. 2 is a top view of the components shown in FIG. 1.

FIG. 3 is a side view of the components shown in FIG. 2.

DETAILED DESCRIPTION

Figure 4A:
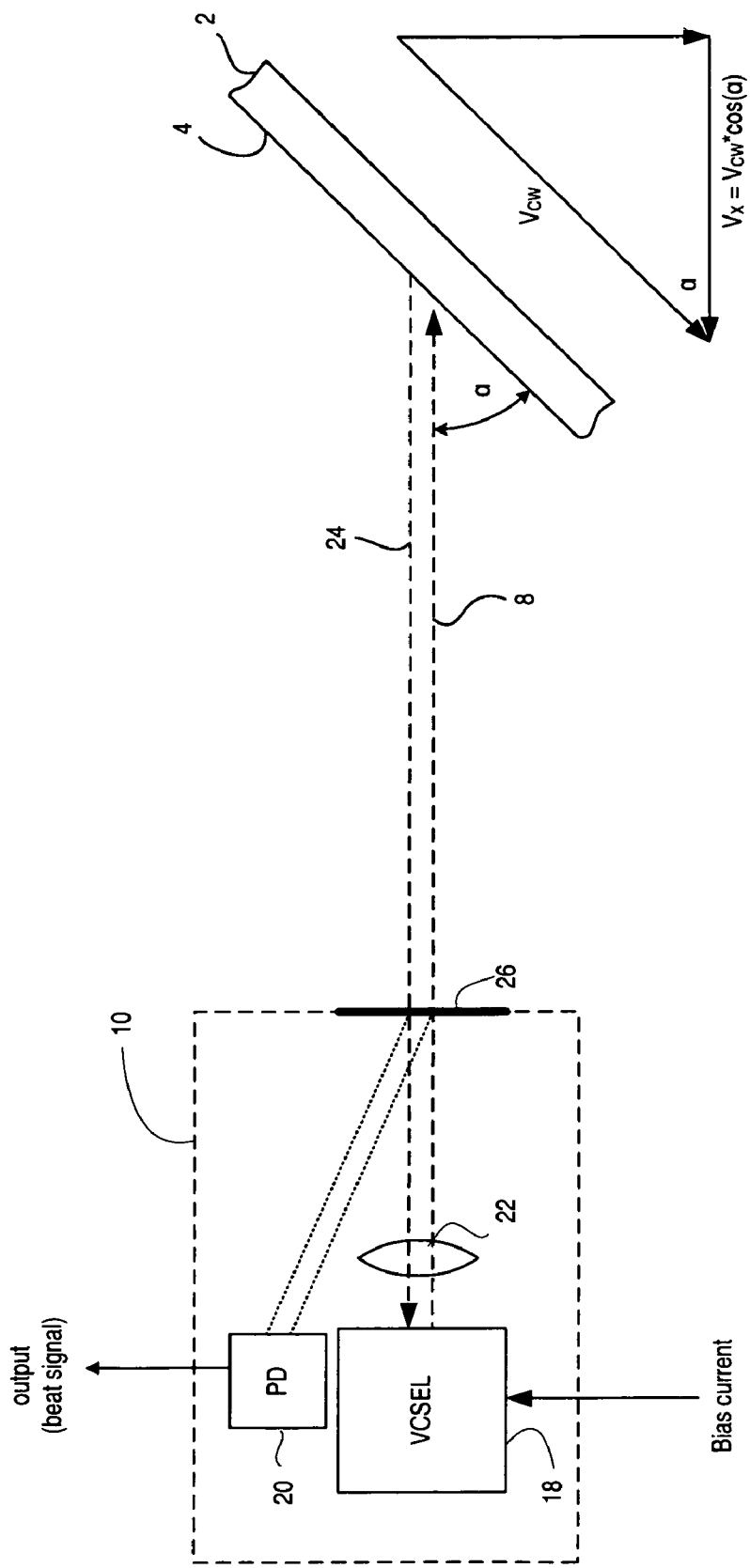
FIG. 4A is a block diagram of the sensor shown in FIGS. 1-3.

At least some illustrative embodiments of the invention employ a laser to measure the velocity with which an object is moving. FIG. 1 shows an overall arrangement of certain components in some of these embodiments. A disk 2 rotates on (or about) an axle 6. Axle 6 is coupled to the remainder of the input device. As used herein, "coupled" includes two components that are attached (movably or fixedly) by one or more intermediate components. Disk 2 could, for example, be a mouse scroll wheel, a volume or other type of control dial, or some other type of device in which the user directly manipulates a rotated member. In such a case, axle 6 may simply be mounted in a bracket or other fixture. In some types of input devices, axle 6 may be coupled to another element which a user moves (or which a user causes to move). As but one example, axle 6 may be coupled to a wheel or ball which a user rotates. Examples of input devices utilizing the arrangement of FIG. 1 (and other arrangements) are provided below. Also shown in FIG. 1 is a laser sensor 10. Sensor 10, the details of which are also described below, directs a beam 8 upon a surface 4 of disk 2. Output from sensor 10 is provided to signal processing components of the input device, which components may determine rotational speed, direction and/or displacement of disk 2. Persons skilled in the art will note that surface 4 of disk 2 can be chosen to maximize the signal return from the laser and thus the signal-to-noise ratio of the Doppler frequency in the beat signal; the Doppler frequency and beat signal are discussed more fully below.

FIG. 2 is a top view of the arrangement shown in FIG. 1. As seen in FIG. 2, disk 2 is alternately rotatable in clockwise (CW) and counterclockwise (CCW) directions. Beam 8 strikes surface 4 of disk 2 at a point at the end of a radius R extending from the rotational center of disk 2. As disk 2 rotates, beam 8 contacts surface 4 at a point which moves along circle 5. In subsequent portions of this description, references to motion of surface 4 relative to beam 8 (and similar language) is intended to refer to the motion of the contact point of beam 8 around circle 5. As also seen in FIG. 2, beam 8 is perpendicular to radius R in the plane of FIG. 2.

FIG. 3 is a side view of disk 2 and sensor 10 taken from the direction shown in FIG. 2. In the plane of FIG. 3, sensor 10 is positioned such that beam 8 is at an angle $\alpha$ to surface 4. Arrow CW shows the direction in which surface 4 moves relative to beam 8 when disk 2 rotates clockwise. Arrow CCW shows the direction in which surface 4 moves relative to beam 8 when disk 2 rotates counterclockwise.

FIG. 4A is a block diagram of sensor 10. For convenience, the orientation of sensor 10 in FIG. 4A has been rotated so that beam 8 is horizontal. Disk 2 has been reoriented in a similar fashion, and portions of disk 2 have been removed. Included in sensor 10 is a vertical cavity surface emitting laser (VCSEL) 18, a photosensitive detector 20, a lens 22 and a partially reflective surface 26. VCSEL 18 receives power in the form of a biasing current. Laser light emanating from the emitting cavity of VCSEL 18 passes through lens 22 and surface 26 to exit sensor 10 as beam 8. A portion of beam 8 is then reflected back into VCSEL 18 (broken line arrow 24), as discussed more fully below. Surface 26 is partially reflective, and thus directs a small portion of the laser beam (approximately 5%) to PD 20. The output of PD 20 varies based on the intensity of light reflected from surface 26. Accordingly, output of PD 20 can also be used to measure the power output of beam 8. PD 20 can be a photodiode, a phototransistor or other type of device which varies its output based on the intensity of received light.

Figure 4B:
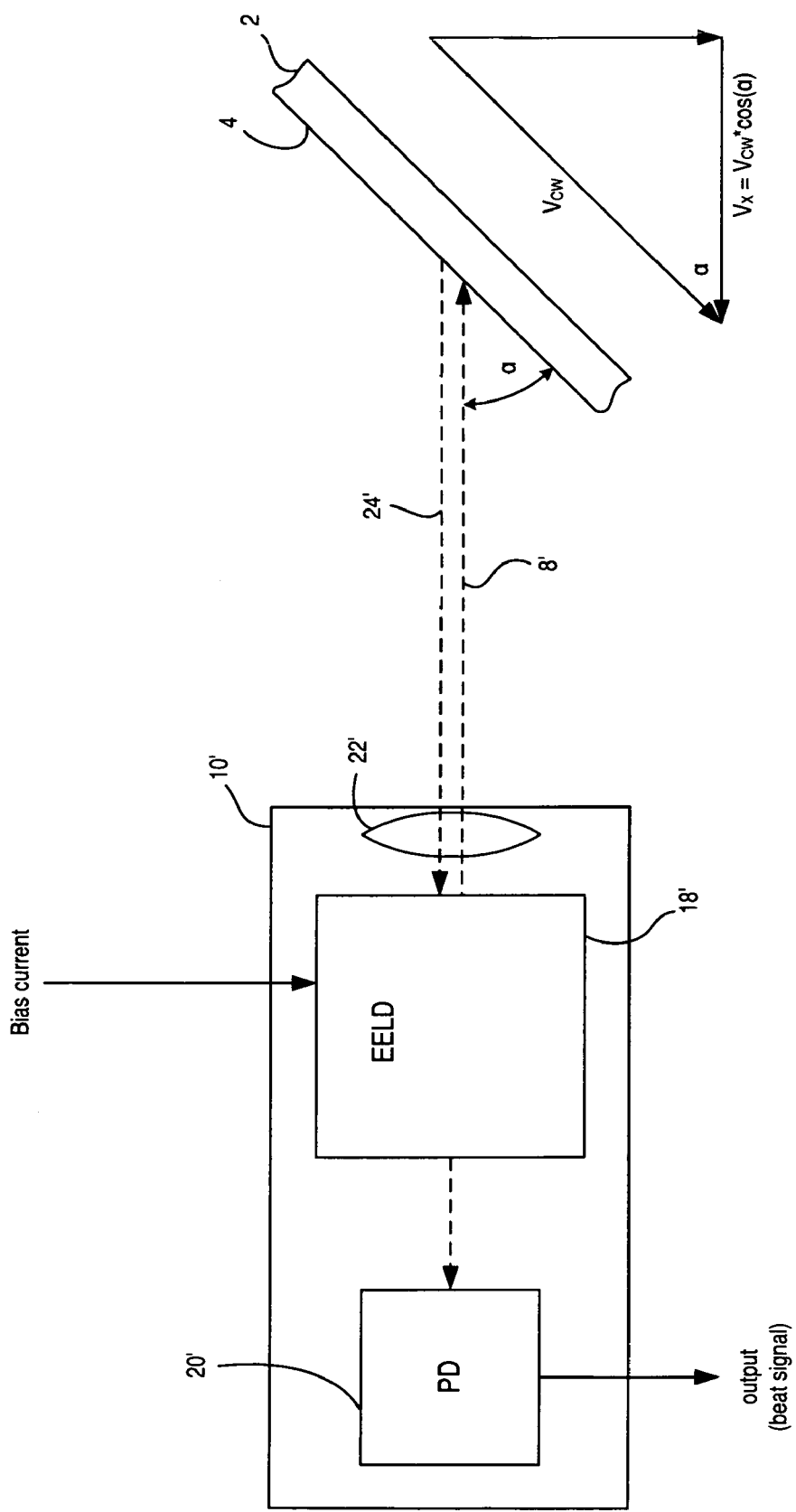
FIG. 4B is a block diagram of an alternate embodiment of a sensor used with the other components shown in FIGS. 1-3.

FIG. 4B is a block diagram of a sensor 10' according to at least some alternate embodiments. Unlike sensor 10, which employs a VCSEL, sensor 10' employs an edge emitting laser diode (EELD) 18'. Unlike a VCSEL, which emits laser from the top, an EELD emits from two sides. Accordingly, laser light from one edge of EELD 18' passes through lens 22' and out of sensor 10' as beam 8'. Light emanating from the other edge of EELD 18' strikes PD 20'; the PD 20' output is thus usable to measure power output in beam 8'. For simplicity, the remainder of this description will refer to sensor 10 of FIG. 4A. It is to be appreciated, however, that sensor 10', EELD 18', PD 20' and beam 8' could respectively be substituted for sensor 10, VCSEL 18, PD 20 and beam 8 in the following description.

Returning to FIG. 4A, beam 8 strikes surface 4 of disk 2 and is reflected back into VCSEL 18. This reflected light (shown schematically as returning broken line 24) enters the emitting cavity of VCSEL 18 and mixes with the light being generated. Because of the self-mixing effect, the power output by VCSEL 18 in beam 8 is affected. Moreover, and as can be seen in FIG. 4A, the reflecting target (surface 4) is moving with respect to VCSEL 18. Specifically, beam 8 strikes surface 4 at an angle $\alpha$ which is between zero and ninety degrees. If disk 2 is rotating clockwise (as shown), surface 4 is moving in relation to beam 8 at a speed $V_{CW}$. That motion includes a component perpendicular to beam 8 ($V_Y$) and a component parallel to beam 8 ($V_X$). The $V_X$ component is equal to $V_{CW}*\cos(\alpha)$. In the example of FIG. 4A, surface 4 is therefore moving toward VCSEL 18 at a velocity of $V_{CW}*\cos(\alpha)$. If disk 2 were rotating counterclockwise, surface 4 would be moving in the opposite direction at a velocity $V_{CCW}$. A component of that motion parallel to beam 8 would thus be moving away from VCSEL at a velocity of $V_{CCW}*\cos(\alpha)$.

Because surface 4 is moving in relation to VCSEL 18, self-mixing will cause the power output of VCSEL 18 to fluctuate in a periodic manner. These periodic fluctuations, or "beats," can be detected by monitoring output from PD 20. The output of PD 20, or "beat signal," will have a frequency which varies based on the speed with which surface 4 is moving relative to VCSEL 18. Moreover, the beat signal frequency will equal the Doppler frequency shift (FD) in the light being reflected from surface 4. The Doppler frequency $F_D$ is related to the velocity of surface 4 as set forth in Equation 1.

$$F_D = \frac{V * \cos(\alpha)}{(\lambda/2)},\quad\text{(Eq. 1)}$$

where λ is the wavelength of light emitted by VCSEL 18.

In Equation 1, V is the linear speed of surface 4 at the point where it is contacted by beam 8. If disk 2 is rotating clockwise (as shown in FIG. 4A), $V=V_{CW}$. If disk 2 is rotating counterclockwise, $V=V_{CCW}$. V can be converted to the rotational speed (ω) of disk 2 using Equation 2.

$$\omega = \frac{V}{R},\quad\text{(Eq. 2)}$$

where R is the distance from the rotational axis to the location at which beam 8 strikes surface 4 (see FIG. 2).

As can be appreciated from the foregoing description and from FIG. 4A, "V" in Equation 1 will be positive for one direction and negative for the opposite direction. Because the Doppler frequency $F_D$ is actually a measure of a frequency shift, $F_D$ will also have a sign corresponding to that of V. However, the frequency of the measured beat signal will not be signed. Although the measured beat frequency can be used with Equations 1 and 2 to determine the magnitude (i.e., absolute value) of the linear speed V or angular velocity ω, something more is needed to determine direction of linear or angular velocity.

Figure 5A:
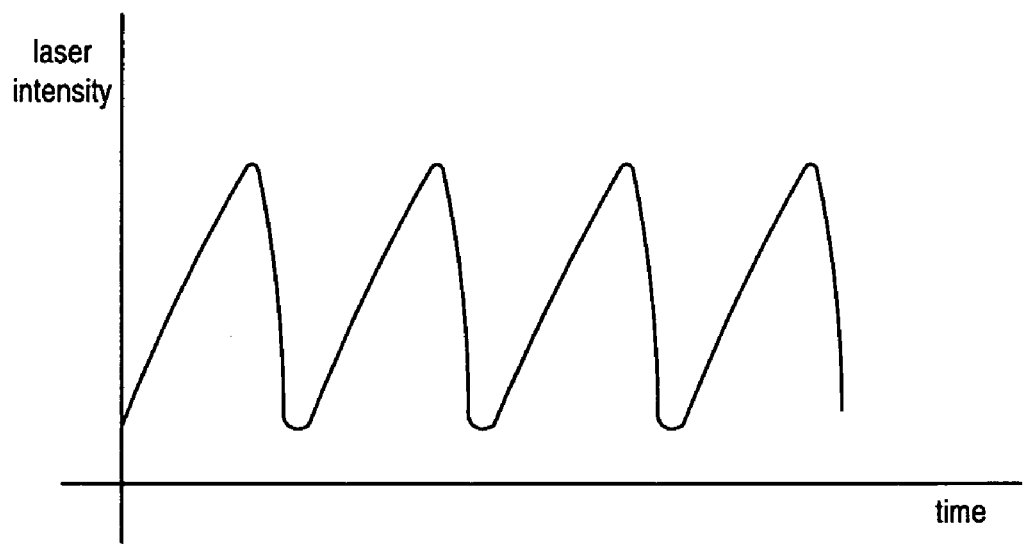
FIGS. 5A and 5B illustrate asymmetry of a self-mixing waveform under certain conditions.
Figure 5B:
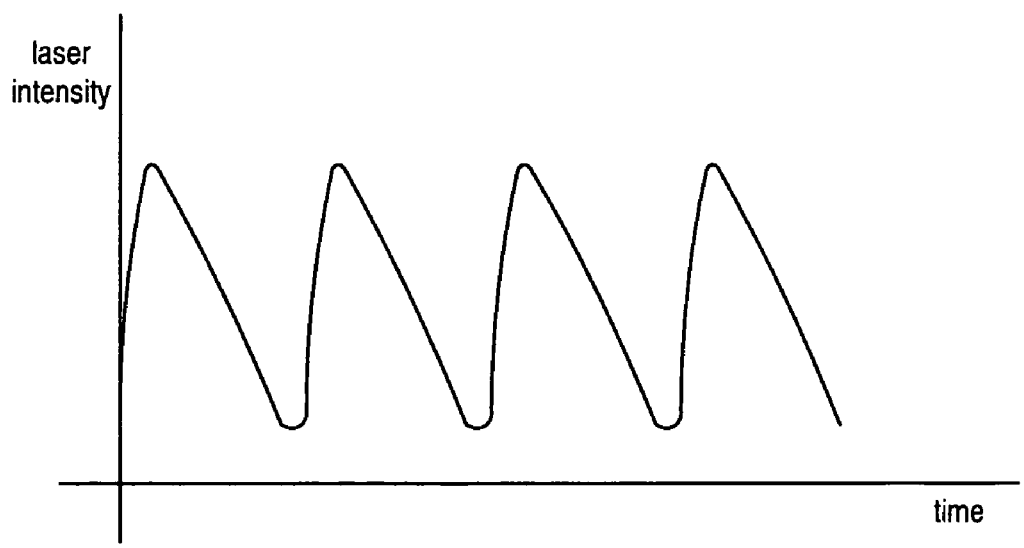

However, other aspects of the beat signal from PD 20 can be employed to determine the direction in which surface 4 is moving relative to VCSEL 18. Under conditions which will often be controllable, the beat signal waveform is asymmetric. As described, e.g., in Wang et al., Self-Mixing Interference Inside a Single-Mode Diode Laser for Optical Sensing Applications," Journal of Lightwave Technology, Vol. 12, No. 9 (IEEE, September 1994), this waveform will approximate a sawtooth wave under certain circumstances. The orientation of the "teeth" in this wave will correspond to the direction in which a reflective target is moving relative to VCSEL 18, as shown in FIGS. 5A and 5B. In FIG. 5A, a surface is moving in one direction relative to a laser and at a constant speed. In FIG. 5B, the surface is moving in the opposite direction at the same speed.

In another approach, direction of motion may be determined using triangular current modulation. In particular, the biasing current of VCSEL 18 is periodically ramped up and down such that a waveform corresponding to the biasing current resembles a series of triangles. As the biasing current increases, the frequency of the light from VCSEL 18 also increases slightly. Conversely, the frequency of light from VCSEL 18 decreases slightly as the biasing current decreases. This causes different Doppler frequency shifts for a given relative movement of surface 4. In other words, for movement of surface 4 at a constant velocity, $F_D$ will vary with the biasing current. Using signal processing techniques known to persons skilled in the art, differences between $F_D$ values on the bias current upslope and on the bias current downslope are compared so as to indicate the direction of motion. If surface 4 is moving toward VCSEL 18, there will be more cycles of the beat signal on the bias current downslope than on the upslope. If surface 4 is moving away from VCSEL 18, there will be more cycles on the bias current upslope than on the downslope. In particular, the upslope current ramp adds an increasing frequency component to the Doppler signal and so has the same effect as adding a positive velocity offset (moving faster away from the source). The downslope current has the same effect as adding a negative velocity offset (moving slower away from the source). If the motion of direction is away from the source, the downslope offset will subtract and the upslope offset will add to the frequency. In this manner the direction can be determined by comparing the effects of the negative and positive offsets on the Doppler frequency.

Figure 6:
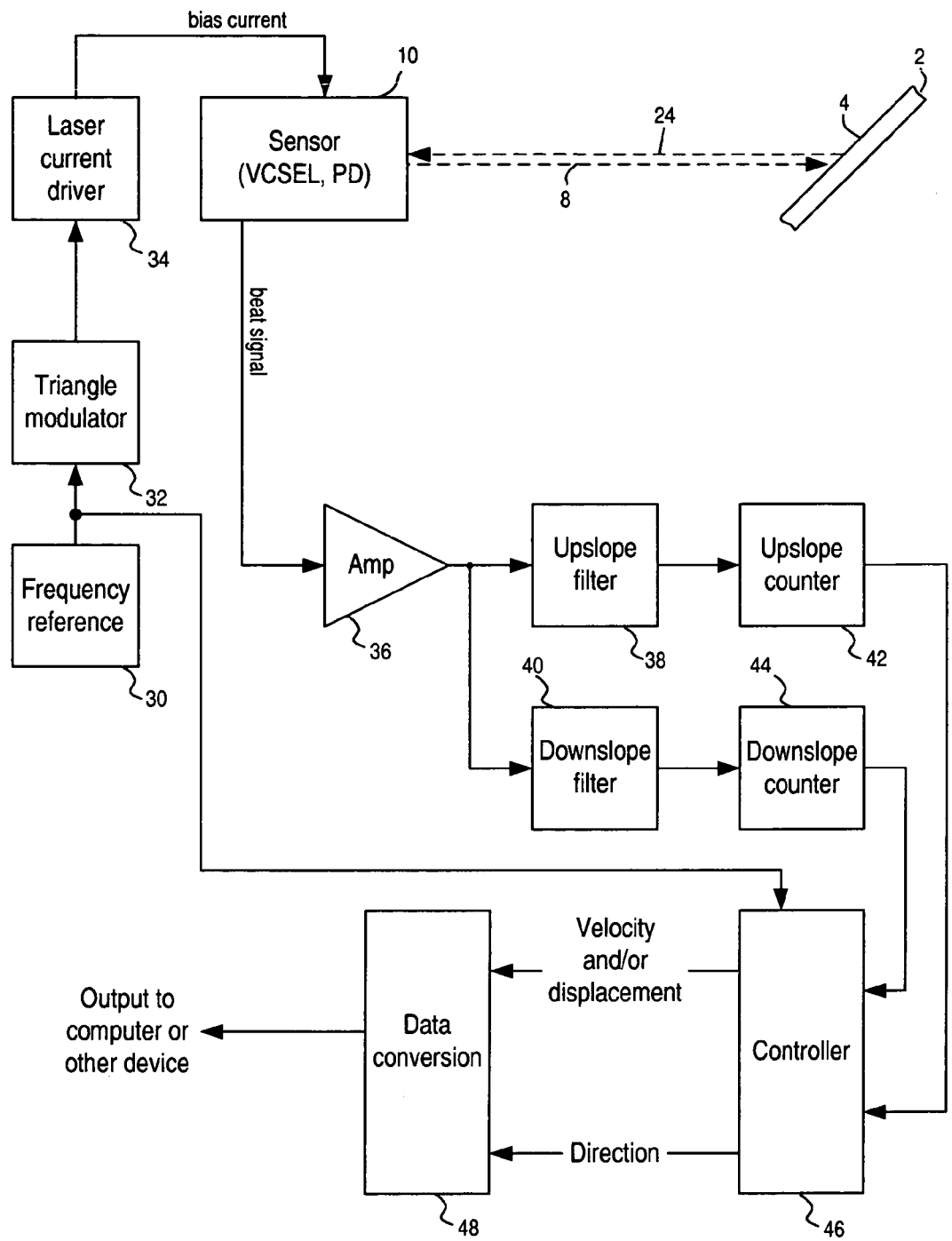
FIG. 6 is a block diagram of at least one illustrative embodiment for a system for determining the speed and direction of a moving surface.

FIG. 6 is a block diagram of one embodiment of a system for determining the speed and direction of surface 4 relative to sensor 10. Sensor 10 is substantially identical to sensor 10 of FIG. 4A, and includes a VCSEL and PD. Based on a frequency input by frequency reference 30, modulator 32 modulates biasing current driver 34 with a triangle wave. Current driver 34 provides the triangularly modulated bias current to the VCSEL of sensor 10. As a result, beam 8 shines onto surface 4 at a frequency whish rises and falls based on that triangular modulation. A portion of the light from beam 8 reflects from surface 4 and is received by the VCSEL of sensor 10. The output of the VCSEL is measured by the PD of sensor 10, which in turn outputs the beat signal. The beat signal is amplified by amplifier 36 and then provided to upslope filter 38 and downslope filter 40. Upslope filter 38 extracts the portion of the amplified beat signal corresponding to the bias current upslope, while downslope filter 40 extracts the portion of the amplified beat signal corresponding to the bias current downslope. The frequencies for the filtered up and downslope portions are then counted in frequency counters 42 and 44 and provided to control unit 46 (e.g., a microprocessor). Control unit 46 knows whether the bias current is on an upslope or downslope based on a signal from reference frequency 30, and calculates the frequency difference between the upslope and downslope Doppler shifts to determine the direction in which surface 4 is moving. Control unit 46 also uses an average of the upslope and downslope Doppler shifts to determine the speed with which surface 4 is moving toward or away from the VCSEL. Because the orientation of surface 4 to the VCSEL (and thus the angle α) is known, control unit 46 then converts the speed and direction of surface 4 motion into an angular velocity (ω) of disk 2. By measuring the time during which disk 2 is rotated at a given ω, the rotational displacement is calculated.

The motion data calculated by controller 46 is then converted in block 48 (which may be a separate controller or microprocessor, or part of controller 46) to a form of data (e.g., counts) recognized by a computer or other equipment receiving user input. That data may also be placed in a Human Interface Device (HID) report or otherwise prepared for transmission according to an appropriate protocol.

In at least some embodiments, the components of FIG. 6 are implemented on a single integrated circuit (IC). That IC may be coupled to multiple sensors like sensor 10, and may determine speed, direction and/or displacement for all of those sensors (by, e.g., time multiplexing inputs from each sensor).

Under some conditions, the embodiment of FIG. 6 may be subject to certain limitations. One possible limitation relates to the characteristics of surface 4. The signal to noise ratio of PD 20 output can be very poor if, e.g., the surface reflectivity is also poor (e.g., an absorbing or transmissive surface for a particular light wavelength). Very low values for velocity of surface 4 may also present problems. As indicated above, the frequency of the beat signal is equal to the Doppler shift $F_D$. As the disk velocity gets smaller, the beat signal frequency will also decrease. When the velocity becomes sufficiently small, there may not be sufficient cycles in a given sampling window for PD 20 output, and velocity may become indeterminate. When velocity (and thus beat signal frequency) is below a certain level, there is a higher probability that noise in the beat signal can result in false velocity determinations. The range of frequency response for the embodiment of FIG. 6 may also be limited. In mouse applications, for example, the beat frequency may have a range of over 200:1. When attempting to amplify and detect signals over such a broad range, it can be very difficult to design fixed filter networks to reject unwanted noise. A Doppler signal in a laser self-mixing velocimeter can also suffer from interfering amplitude modulation and broad frequency spreading. For these reasons, it can be difficult (at least with conventional approaches) to accurately detect frequency or to expand the velocity measurement dynamic range or the movement direction discrimination dynamic range.

Figure 7A:
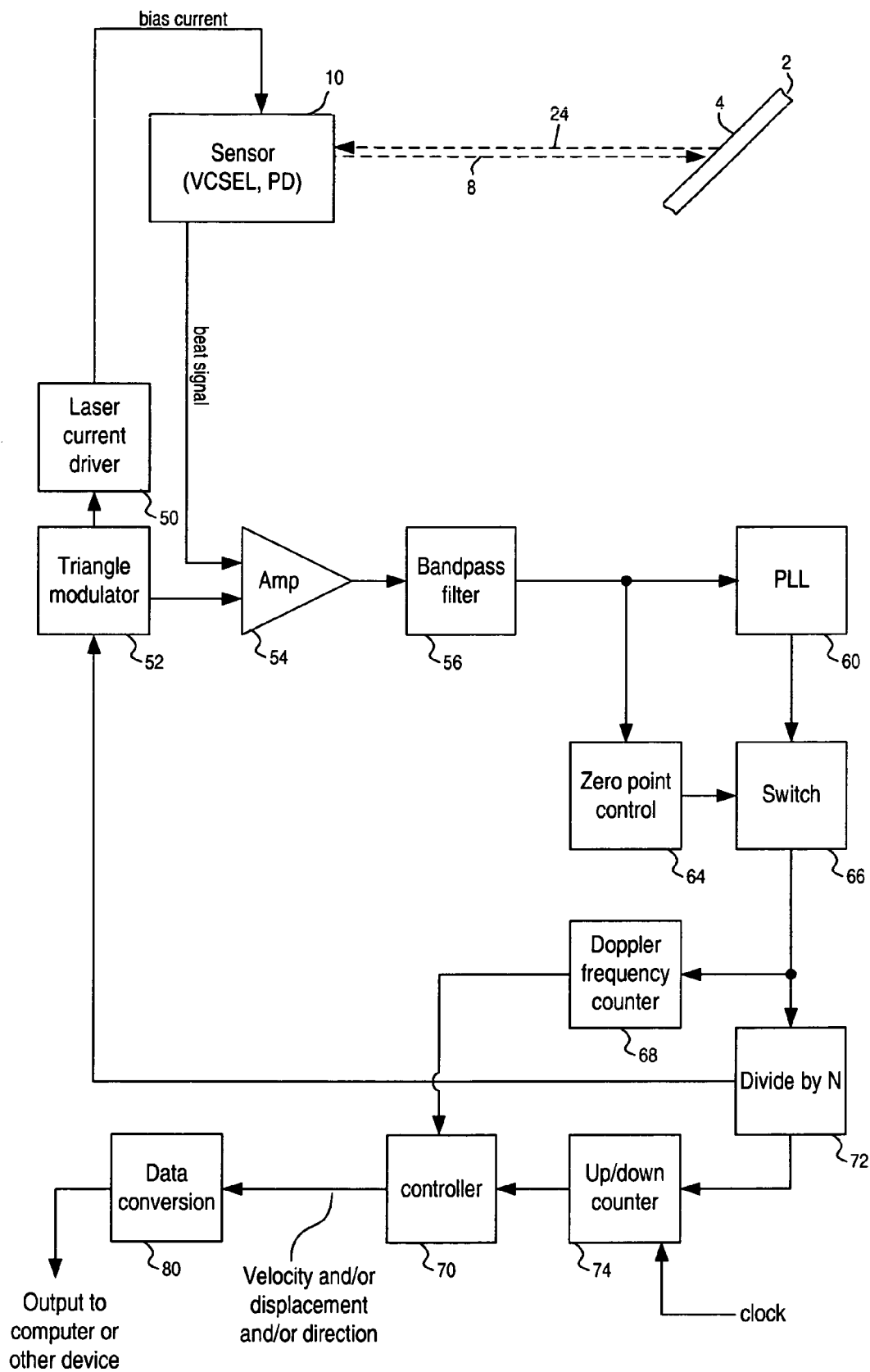
FIG. 7A is a block diagram of another illustrative embodiment for a system for determining speed and direction of a moving surface.

FIG. 7A is a block diagram for a system, according to at least some additional embodiments, which addresses some of the possible problems associated with the system of FIG. 6. Sensor 10 is substantially identical to sensor 10 of FIG. 6, and includes a VCSEL and a PD (not shown in FIG. 7A). As in the embodiment of FIG. 6, the VCSEL of sensor 10 is driven by a triangularly modulated biasing current received from a current driver 50. Similar to the embodiment of FIG. 6, current driver 50 is controlled by triangle modulator 52. Unlike triangle modulator 32 of FIG. 6, however, triangle modulator 52 does not modulate at a constant reference frequency. As explained in more detail below, the frequency of the triangle wave by which modulator 52 controls driver 50 is varied based on the Doppler frequency $F_D$.

Returning to sensor 10, the beat signal output by the PD is fed to amplifier 54 so as to increase the strength of the beat signal. Also input to amplifier 54 from modulator 52 is the frequency of the triangle wave used to control driver 50. Because the VCSEL of sensor 10 is being driven with a triangle wave bias current, the beat signal will include a harmonic having the triangular wave frequency (even in the absence of any movement of surface 4). Accordingly, amplifier 54 also subtracts the triangle wave frequency from the beat signal. The output of amplifier 54 is then input to bandpass filter 56 to remove frequencies outside a predetermined range (e.g., 4-500 KHz). The output from bandpass filter 56 is then input to analog phase locked loop (PLL) 60 for additional noise reduction.

Because analog PLLs have good noise rejection and amplitude modulation rejection qualities, they can be used to regenerate a less-noisy version of a noisy input signal.

In particular, an analog PLL can be used to enhance the accuracy with which Doppler frequency and velocity are measured. However, conventional analog PLLs have a limited "lock" range of approximately ±20% of the center frequency of the voltage controlled oscillator (VCO) in the PLL. In other words, such a PLL would only be able to reproduce input frequencies that are within 20% of the VCO center frequency. If a conventional analog PLL were used in the system of FIG. 7A, the system would be limited to measuring velocities that are within 20% of some reference velocity. For example, a conventional analog PLL selected such that its VCO center frequency corresponded to a measured velocity of 1 m/s would only be able to measure speeds of approximately 0.8 m/s to 1.2 m/s. Such limited range is not acceptable in some applications.

In the embodiment of FIG. 7A, these limitations are avoided through use of a difference frequency analog phase locked loop (DFAPLL). In particular, a VCO of the analog PLL has a center frequency which is substantially higher than the highest expected beat signal frequency, but which also has a frequency response which is sufficiently wide. A frequency downconverter is then used to subtract a reference frequency from the VCO output. Because the lock-in range of a DFA-PLL can be quite large (e.g., 2 KHZ~1 MHZ), a DFAPLL can be used to expand the velocity measurement dynamic range.

Figure 7B:
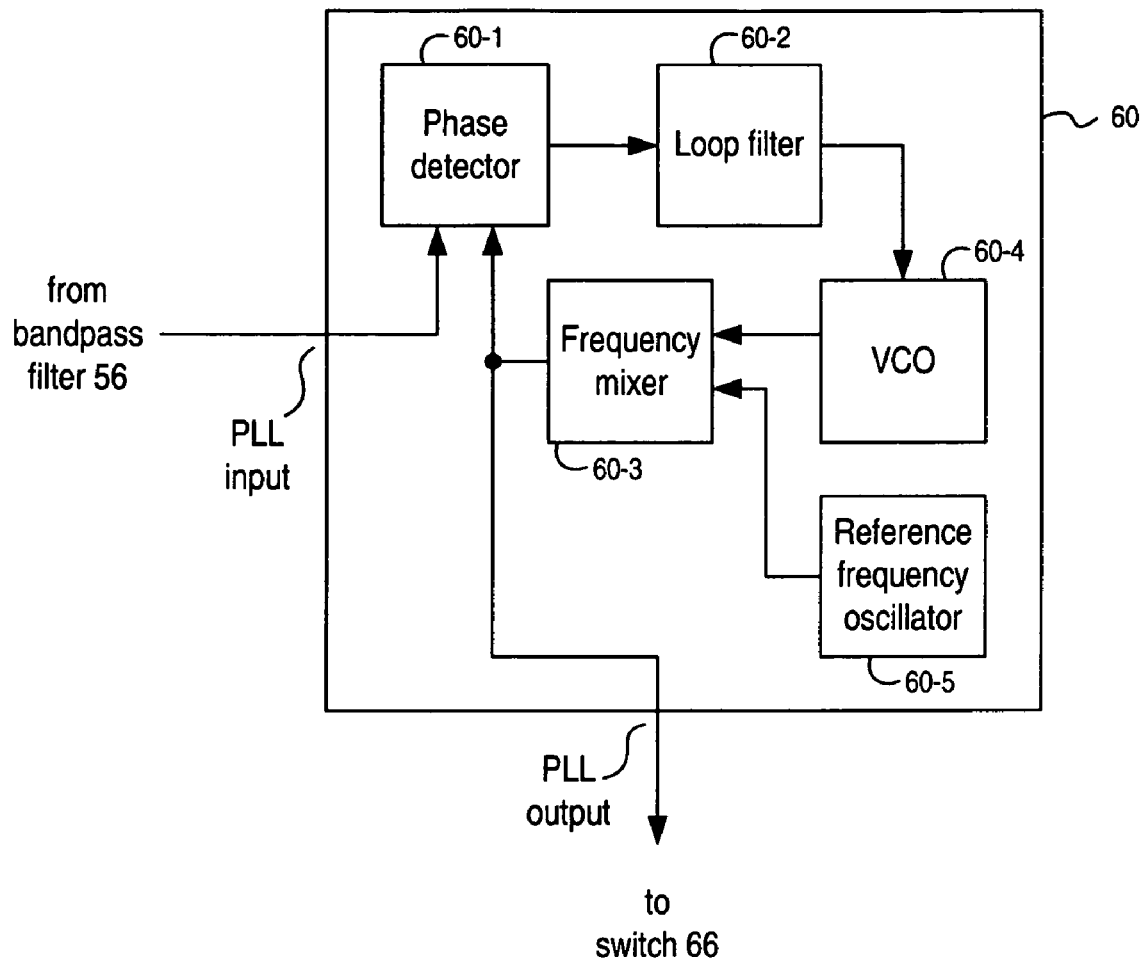
FIG. 7B is a block diagram of the phase locked loop (PLL) of FIG. 7A.

The details of PLL 60 are shown in more detail in the block diagram of FIG. 7B. The signal from bandpass filter 56 (e.g., the amplified and filtered beat signal) is input to phase detector 60-1. Phase detector 60-1 measures the difference in phase between the beat signal frequency and the output from frequency mixer 60-3, which is discussed below. The phase difference signal from phase detector 60-1 is then filtered by loop filter 60-2 and fed to VCO 60-4. Similar to conventional PLLs, VCO 60-4 then adjusts its output frequency based on the phase difference signal. Specifically, if the beat signal frequency is lower than the other frequency input to phase detector 60-1 (i.e., the input received from mixer 60-3), VCO 60-4 decreases its output frequency. If the beat signal frequency is higher than the other frequency input to phase detector 60-1, VCO 60-4 increases its output frequency.

The output of VCO 60-4 is fed to mixer 60-3. Also fed to mixer 60-3 is a reference frequency generated by reference frequency oscillator 60-5. In mixer 60-3, the frequency of the signal output by VCO 60-4 is reduced (or "downconverted") by the reference frequency from oscillator 60-5. The downconverted output from mixer 60-3 is then fed to phase detector 60-1. As previously indicated, phase detector 60-1 compares the beat signal with the output from mixer 60-3 to generate the phase difference signal. Because VCO 60-4 continually adjusts its output so as to reduce the phase difference signal, and because the VCO output is frequency downconverted in mixer 60-3 so as to be within the range of the beat signal frequency, the output from mixer 60-3 will match the beat signal frequency once PLL 60 reaches equilibrium. However, the output of mixer 60-3 is a purified form of the signal received from bandpass filter 56. In particular, processing by PLL 60 removes noise in the beat signal caused by things such as speckling of beam 8 on surface 4 (see FIG. 7A). This purified version of the beat signal is output from PLL to switch 66.

The following example illustrates the operation of PLL 60. Suppose that the beat signal frequency will, for the range of velocities to be measured, vary between 4 KHz and 400 KHz. A conventional analog PLL would be unable to reproduce frequencies over that entire range. For example, a VCO with a center frequency of 202 KHz (halfway between 4 KHz and 400 KHz) would only be able to output frequencies between approximately 162 KHz and 242 KHz. However, VCO having a 2.5 MHz center frequency would be able to output a sufficiently wide range of frequencies. Specifically, such a VCO could output frequencies from approximately 2 MHz (80% of 2.5 MHz) to approximately 3 M z (120% of 2.5 MHz), a spread of approximately 1000 KHz. Because the output of such a VCO would always be higher than the beat signal frequency, however, the VCO output is reduced by a reference frequency of 2.0 MHz. If the beat signal input to phase detector 60-1 had a frequency of 20 kHz, for example, VCO 604 would (after PLL 60 reaches equilibrium) output a 2.02 MHz signal. After downconversion by the 2 MHz reference frequency, a 0.02 MHz (20 KHz) signal is output by 60-3. Similarly, a 390 KHz beat signal input to phase detector 60-1 would cause VCO 60-4 to ultimately output a 2.39 MHz signal. After downconversion by the 2 MHz reference frequency, a 0.39 MHz (390 KHz) signal would be output by 60-3.

The signal from switch 66 is provided to Doppler frequency counter 68 and to divider block 72. In Doppler frequency counter 68, the Doppler frequency is determined by counting the beat signal cycles. Because current modulation causes the VCSEL to have different frequencies on the up- and downslopes of the triangle wave, beat signal cycles are counted over an entire triangle wave period. Frequency counter 68 then provides the Doppler frequency to controller 70. Controller 70 (which may be, e.g., a microprocessor) then converts the Doppler frequency from counter 68 into the speed of the target surface relative to sensor 10. Angular velocity and displacement of disk 2 are then determined based on the time during which surface 4 moved at the calculated speed.

Figure 8A:
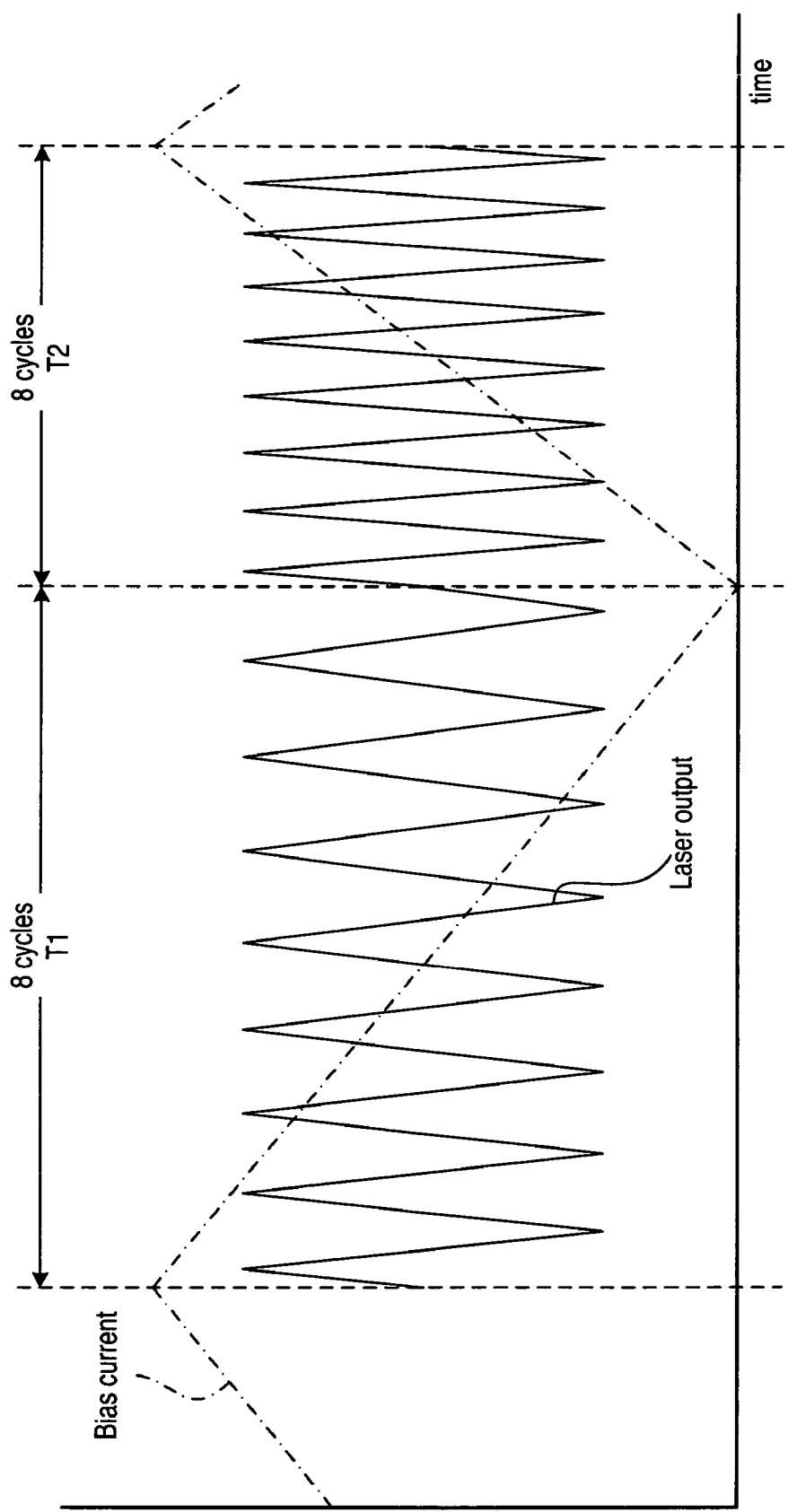
FIGS. 8A and 8B illustrate triangular modulation according to at least some illustrative embodiments.
Figure 8B:
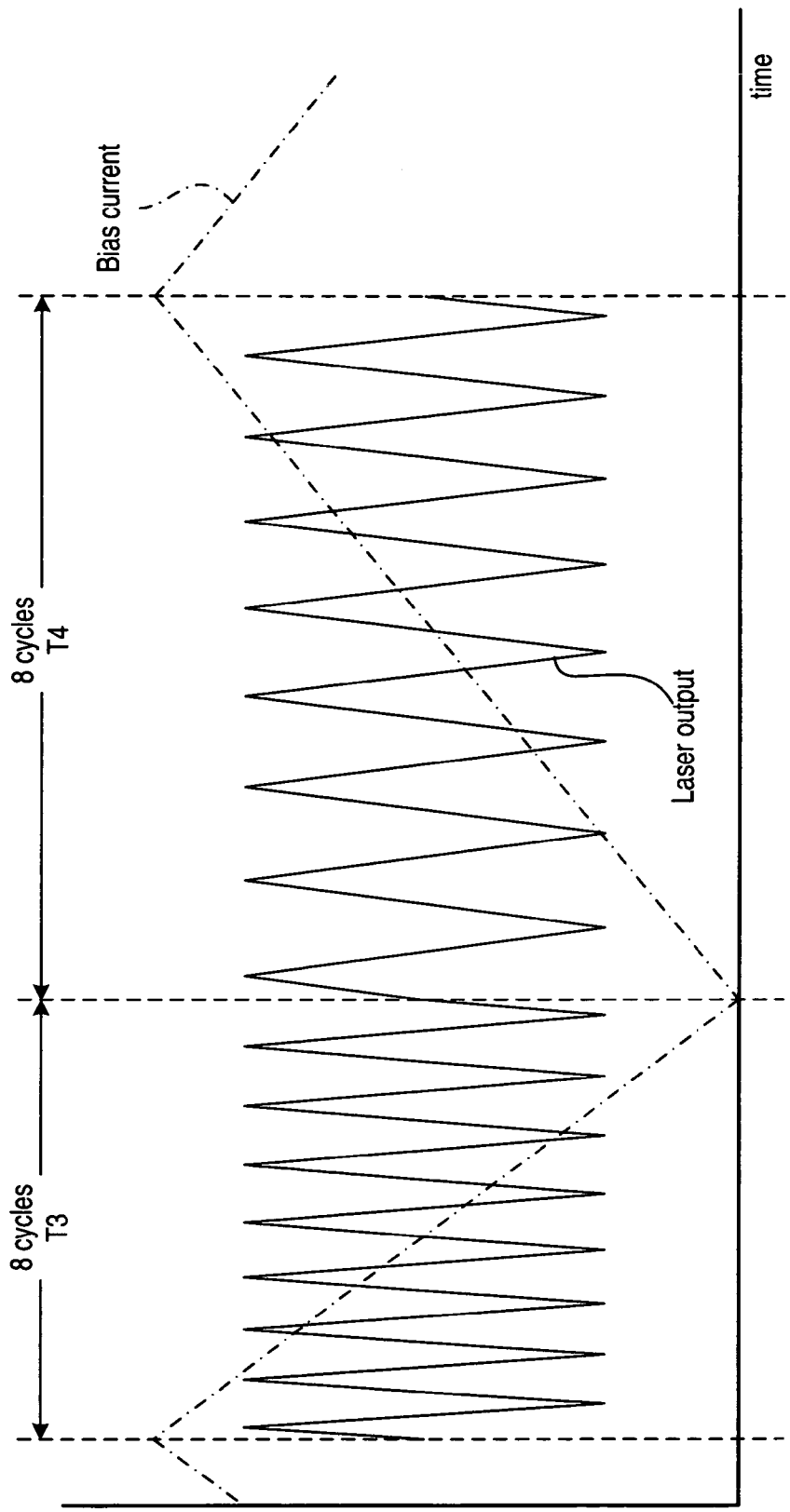

In divide-by-N block 72, the frequency of the signal from switch 66 is reduced to a submultiple. In at least some embodiments, the frequency of the signal received at block 72 is divided by 16 (i.e., N=16). Of course, other submultiples could be used. The divided-down signal from block 72 is then provided to triangle modulator 52 and to the up/down control of counter 74. Modulator 52 uses the signal received from block 72 to set the frequency of the triangle wave used to modulate current driver 50. This is shown in FIG. 8A, where the higher frequency wave from switch 66 is shown with a solid line and the triangle wave from modulator 52 is shown with an uneven broken line. As seen in FIG. 8A, the direction of the triangle wave (i.e., from rising to falling or from falling to rising) changes every 8 cycles of the beat frequency.

The direction in which a surface is moving relative to sensor 10 can be determined by comparing the time needed for 8 beat signal cycles on the triangle wave downslope with the time needed for 8 beat signal cycles on the triangle wave upslope. If the time for 8 cycles on the triangle wave downslope is longer than the time for 8 cycles on an adjacent triangle wave upslope, then surface 4 is moving away from sensor 10. Conversely, if the time for 8 cycles on the triangle wave downslope is less than the time for 8 cycles on an adjacent triangle wave upslope, then surface 4 is moving toward sensor 10.

Because the triangle wave modulating the bias current for the VCSEL is locked to a submultiple of the beat signal frequency, however, there will be the same number of beat frequency cycles (8 in the present example) on the up- and downslopes of the triangle wave. Accordingly, the duration of the up- and downslopes can be measured instead of repeatedly counting 8 beat frequency cycles. As indicated above, up/down counter 74 receives an output from divide-by-N counter 72. Up/down counter block 74 also receives a separate high-frequency clock signal (with fixed time units) and counts the number of high frequency clock cycles on the up- and downslopes. In particular, the output of the divide-by-N counter (block 72) controls the counting direction of up/down counter 74. Counter 74 counts up on the triangle wave upslope and down on the triangle wave downslope. If the upslope period is longer than the downslope period, counter 74 will not underflow. If the downslope period is longer than the upslope period, counter 74 will underflow. In this manner, the borrow output (not shown) of counter 74 can be used as the direction indicator.

Determining movement direction in this manner offers several potential advantages over the system of FIG. 6 under certain conditions. In the system of FIG. 6, varying and non-integral numbers of beat signal cycles can occur on the up- and downslope of the modulation wave. Moreover, an instantaneous frequency shift occurs at the peak of the triangle wave. If a phase change occurs in the middle of a beat signal cycle, that cycle might not be counted, and system accuracy may be degraded with regard to both speed and direction determination. The triangular modulation aspect of FIG. 7A reduces measurement uncertainty, as there are an integral number of beat signal cycles on the up- and downslopes of the triangle wave, and less likelihood of missing a count. Maintaining a constant number of beat signal cycles per triangle wave and varying the triangle wave frequency also simplifies direction determination, as it is only necessary to compare times for the preset number of cycles on the up- and downslopes. Using a divided-down version of the Doppler frequency as the modulation frequency expands the movement direction discrimination dynamic range.

Returning to block 56 of FIG. 7A, the output from bandpass filter 56 is also provided to zero point control block 64. In block 64, the amplitude of the signal from bandpass filter 56 is averaged over a suitable interval. If the average is less than a predetermined threshold, the output from PLL 60 is disabled by opening switch 66. In this manner, the velocity calculation is temporarily disabled while the disk velocity is too small to be reliably measured, as a low amplitude signal is indicative of few (or no) beats during a sampling period.

The motion data calculated by controller 70 is then converted in block 80 (which may be a separate controller or microprocessor, or part of controller 70) to a form of data (e.g., counts) recognized by a computer or other equipment receiving user input. That data may also be placed in a Human Interface Device (HID) report or otherwise prepared for transmission according to an appropriate protocol.

In at least some embodiments, the components of FIGS. 7A and 7B are implemented on a single integrated circuit (IC). That IC may be coupled to multiple sensors like sensor 10, and may determine speed, direction and/or displacement for all of those sensors (by, e.g., time multiplexing inputs from each sensor).

Figure 9:
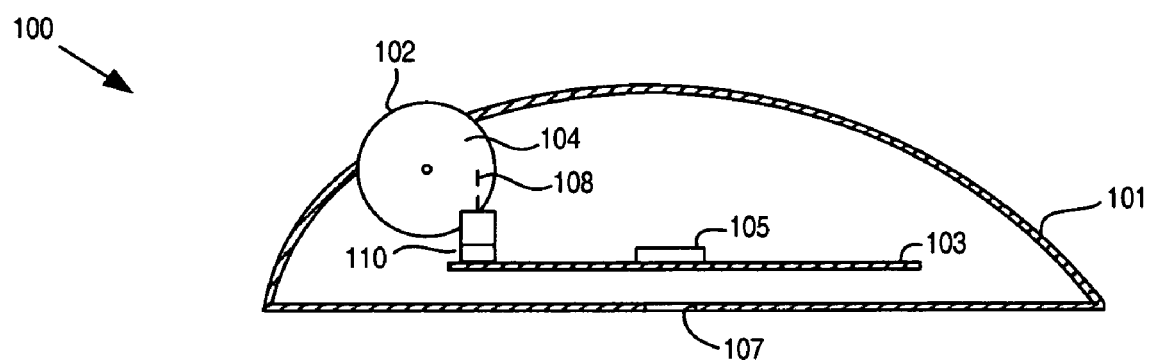
FIG. 9 shows a mouse scroll wheel, according to at least some illustrative embodiments, implementing a laser self-mixing velocimeter.

A laser self-mixing velocimeter can be used in many different types of input devices. FIG. 9 shows mouse 100 which encodes rotational motion of a scroll wheel 102 using a laser self-mixing velocimeter. Mouse 100 includes a case 101 and printed circuit board (PCB) 103. PCB 103 holds a sensor 110, which is substantially similar to sensor 10 of FIG. 4A. As shown in FIG. 9, scroll wheel 102 and sensor 110 are arranged similar to disk 2 and sensor 10 of FIGS. 1-3. Specifically, sensor 110 is positioned relative to scroll wheel 102 so that beam 108 shines on surface 104 at an angle similar to the angle α of previous figures. Based on a beat signal output by sensor 110 while scroll wheel 102 turns, IC 105 determines the angular displacement. In some embodiments, IC 105 includes detection components similar to some or all of those described with regard to FIG. 6. In other embodiments, IC 105 includes detection components similar to some or all of those described with regard to FIGS. 7A and 7B. IC 105 also includes imaging components which, via an aperture 107 in the lower case of mouse 101, track motion of mouse 101 across a desk or other surface.

Figure 10A:
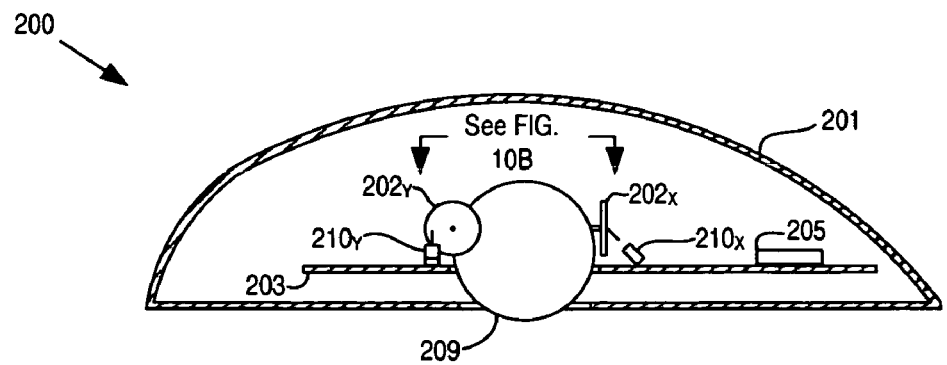
FIGS. 10A and 10B show a mouse, according to at least some illustrative embodiments, implementing laser self-mixing velocimeters.
Figure 10B:
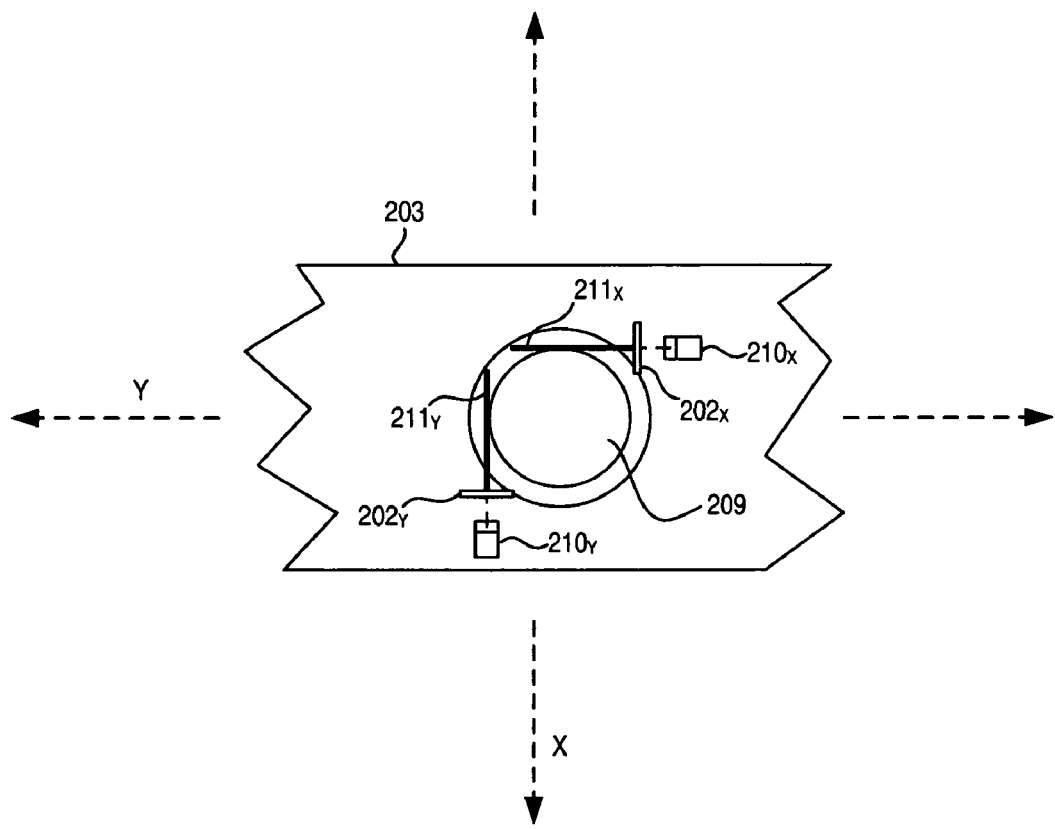

FIG. 10A is one example of a mouse which uses laser self-mixing velocimeters to track mouse motion across a desk or other surface. Similar to prior art mice, mouse 200 includes a ball 209 which rolls as a user moves mouse 200 across a surface. As seen in FIG. 10B, disk 202$_Y$ is coupled to ball 209 by axle 211$_Y$ in contact with the surface of ball 209. As mouse 200 is moved across a surface along the Y axis, ball 209 rolls and causes disk 202$_Y$ to rotate. By measuring the angular displacement of disk 202$_Y$, the Y axis motion of mouse 200 is determined. Similarly, disk 202$_X$ is coupled to ball 209 by axle 211$_X$ in contact with the surface of ball 209. As mouse 200 is moved across a surface along the X axis, ball 209 rolls and causes disk 202$_X$ to rotate. By measuring the angular displacement of disk $202_X$, the X axis motion of mouse 200 is determined. In prior art mice, slotted (or "spoked") encoder wheels are located where disks $202_X$ and $202_Y$ are shown in FIGS. 10A and 10B. Rotary motion of those slotted encoder wheels would then be determined using LED-receptor pairs. However, motion of disks $202_X$ and $202_Y$ in mouse 200 is encoded using laser self-mixing sensors $210_X$ and $210_Y$. Sensor $210_X$ and disk $202_X$ (as well as sensor $210_Y$ and disk $202_Y$) is arranged similar to disk 2 and sensor 10 (FIG. 2), and communicates with IC 205. IC 205 determines rotational displacement of disks $202_X$ and $202_Y$ using, e.g., one or more aspects of the systems and methods previously described in connection with FIGS. 1-8B.

Figure 11A:
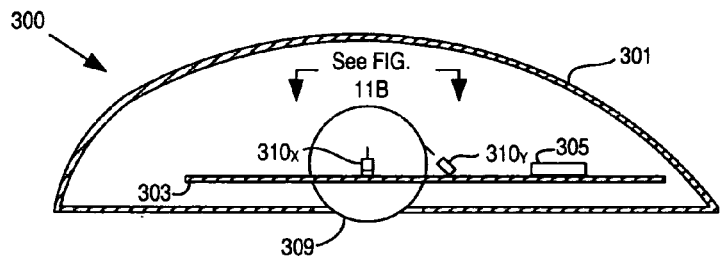
FIGS. 11A-11C show a mouse, according to at least some illustrative embodiments, implementing laser self-mixing velocimeters.
Figure 11B:
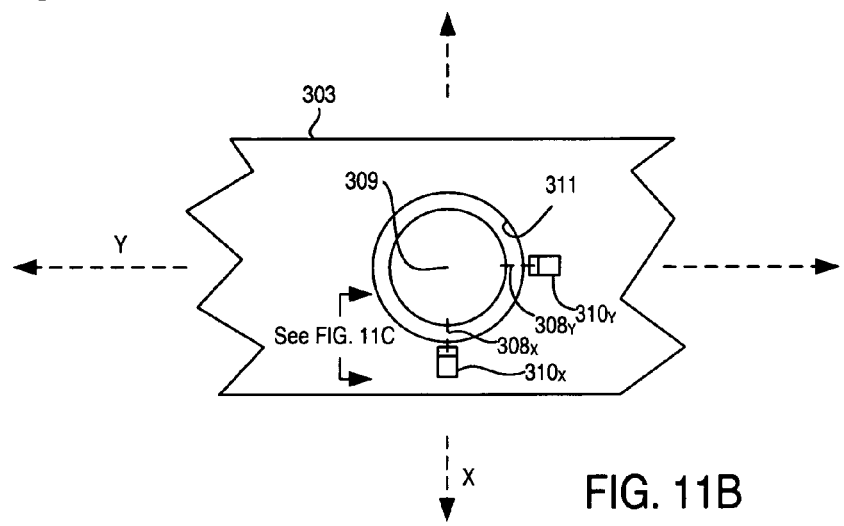
Figure 11C:
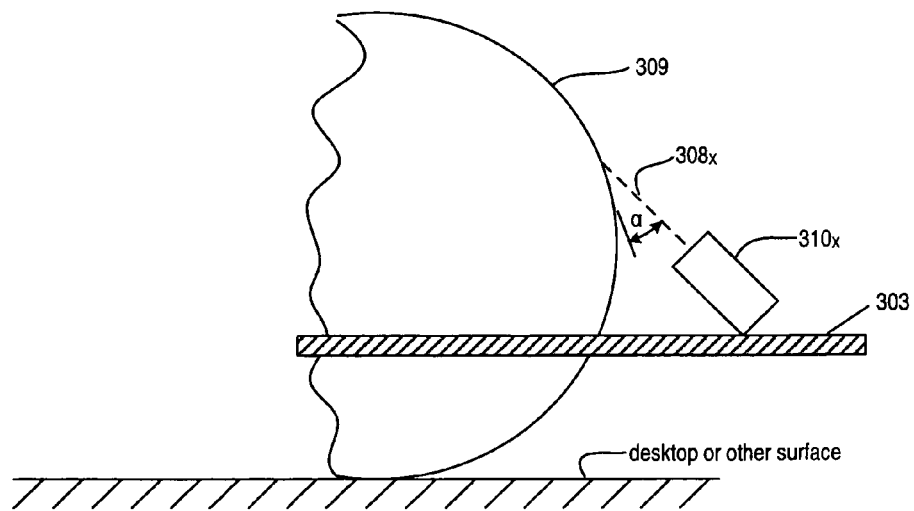

FIGS. 11A-11C show another embodiment of a mouse which tracks motion using laser self-mixing sensors. Mouse 300 includes a case 301, a PCB 303 and a ball 309. As with mouse 200 of FIG. 10, movement of mouse 300 across a desktop or other surface causes ball 309 to roll. Unlike mouse 200, however, mouse 300 does not include separate disks rotatably coupled to ball 309. Instead, sensors $310_X$ and $310_Y$ are positioned on PCB 303 so as to shine onto the surface of ball 309 at an angle α (see FIG. 11C). Sensors $310_X$ and $310_Y$ are respectively aligned with X and Y axes (FIG. 11B). Each of sensors $310_X$ and $310_Y$ is similar to sensor 10 of FIG. 2, and communicates with IC 305. IC 305 determines rotational displacement of ball 209 about the X and Y axes using, e.g., one or more aspects of the systems and methods previously described in connection with FIGS. 1-8B.

Figure 12A:
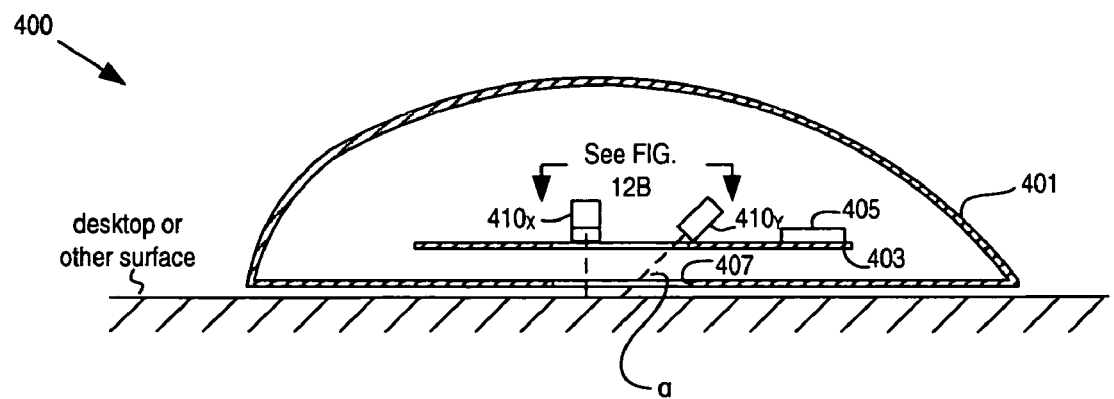
FIGS. 12A and 12B show a mouse, according to at least some additional embodiments, implementing laser self-mixing velocimeters.
Figure 12B:
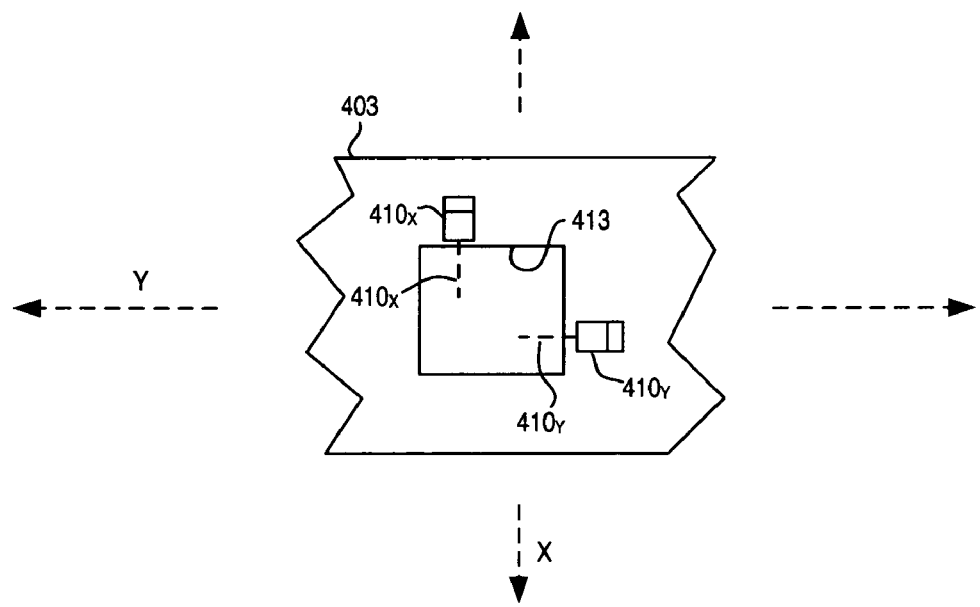

Thus far, the description has focused on encoding rotational motion. It is to be appreciated, however, that laser self-mixing sensors and detection systems such as those described above are also useful for encoding linear motion. Referring again to Equation 1, the "V" in that equation may not correspond to motion on a rotating surface. Instead, that velocity may be a velocity of a sensor with regard to a surface over which the sensor is moving in a straight line. FIGS. 12A and 12B show one example of an embodiment in which a laser self-mixing sensor is used to encode such linear motion.

Shown in FIG. 12A is a mouse 400 having a case 401, a PCB 403 and a pair of sensors $410_X$ and $410_Y$. Sensors $410_X$ and $410_Y$ are similar to sensor 2 described above in connection with previous figures. Unlike sensor 2, however, sensors $410_X$ and $410_Y$ shine (at an angle α) on a desktop or other surface across which mouse 400 is moved. As seen in FIG. 12B, sensors 410 are positioned near edges of an opening 413 in PCB 403. Sensors $410_X$ and $410_Y$ shine their beams through opening 413, and through an aperture 407 in case 401, onto the desktop or other surface. Sensors $410_X$ and $410_Y$ each communicate with an IC 405. Based on beat signals received from sensors $410_X$ and $410_Y$, IC 405 determines velocity of sensors $410_X$ and $410_Y$ (and thus, mouse 400) relative to the desktop along the X and Y axes. IC 405 determines X and Y axis velocity using, e.g., one or more aspects of the systems and methods previously described in connection with FIGS. 6-8B.

Figure 13:
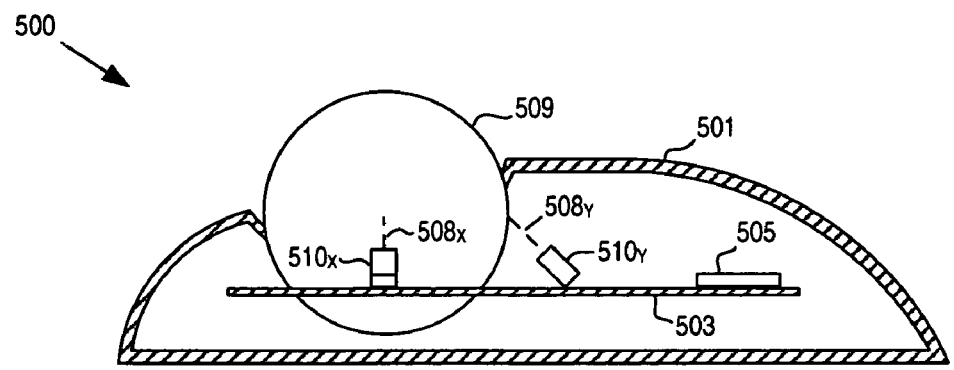
FIG. 13 shows a trackball, according to at least some illustrative embodiments, implementing laser self-mixing velocimeters.

FIG. 13 shows a trackball 500 according to at least some embodiments of the invention. Trackball 500 includes a case 501, PCB 503 and a ball 509. Sensors $510_X$ and $510_Y$ shine beams $508_X$ and $508_Y$ on ball 509. Based on beat signals received from sensors $510_X$ and $510_Y$, IC 505 determines rotational displacement of ball 509 about X and Y axes corresponding to sensors $510_X$ and $510_Y$. Operation of trackball 500 is very similar to that of mouse 300 (FIGS. 11A-11C), except that housing 501 remains stationary and the user directly manipulates ball 509.

Figure 14:
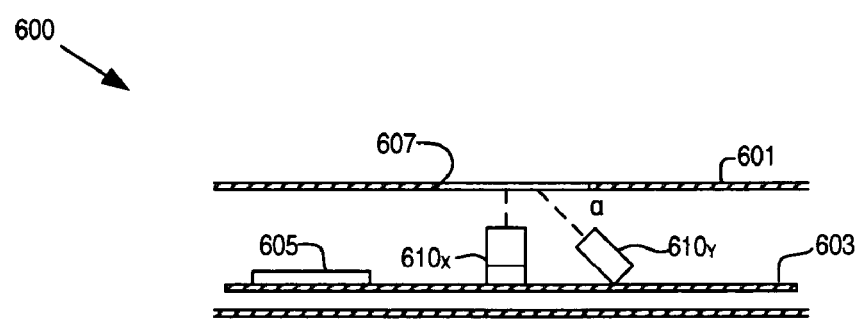
FIG. 14 shows a finger-tracking input device, according to at least some illustrative embodiments, implementing laser self-mixing velocimeters.

FIG. 14 shows an input device 600 according to still other embodiments. Device 600 includes a case 601. In some cases, device 600 may be physically integrated into the housing of a laptop computer, personal digital assistant (PDA), mobile phone, or other type of equipment. Accordingly, case 601 could be the housing of such computer, PDA, etc. A PCB 603 inside case 601 holds two sensors $610_X$ and $610_Y$ in communication with IC 605. Each of sensors $610_X$ and $610_Y$ is similar to sensor 10 described above, and is positioned to shine a laser beam through a transmissive region 607 (e.g., an opening or transparent window) at an angle α. As a user moves a finger (not shown) across region 607 along X and Y axes corresponding to sensors $610_X$ and $610_Y$, IC 605 determines the amount of finger movement, relative to device 600, along the X and Y axes. As can be appreciated, operation of input device 600 is similar to that of mouse 400 (FIGS. 12A and 12B), except that device 600 remains stationary and the tracking surface is the user's finger.

The invention includes numerous other variations, modifications, combinations and sub-combinations of the previously described systems and methods. For example, the physical arrangement of components shown in the drawings can be varied. Referring to FIG. 2, for instance, beam 8 is perpendicular to radius R in the plane of FIG. 2. However, this need not be the case. If beam 8 were at an angle β to radius R (and not parallel to radius R), the left side of Equation 1 would simply be multiplied by sin(β). The sensors and detection systems described above can also be used in connection with other types of motion encoding systems. For example, a single laser and light splitting optics could be used to implement a sensor as described above and a second type sensor (e.g., a sensor using a speckle-based method). For instance, a single laser could be coupled to multiple optical fibers, with the free end of each optical fiber becoming a sensor. The signals in each fiber could be discriminated in a time-division manner (e.g., using one or more digital micromirror devices acting as shutters for each fiber) or in a frequency-division manner (e.g., each fiber is sized such that a known and different frequency shift is added to the signal generated with that fiber).

The above-described sensors and related components for detecting speed, direction and displacement can be used in connection with other types of input devices. However, the described sensors and detection components are not limited to use as part of an input device. One or more aspects of the previously described sensors and detection components can be used in any application where it is desirable to determine speed, direction and/or displacement of objects relative to one another.

Although examples of carrying out the invention have been described, those skilled in the art will appreciate that there are numerous variations and permutations of the above described devices that fall within the spirit and scope of the invention as set forth in the appended claims. It is to be understood that the subject matter defined in the appended claims is not necessarily limited to the specific features or acts described above. Rather, the specific features and acts described above are disclosed as example forms of implementing the claims.

The invention claimed is:

1. An input device, comprising:
   a member configured to rotate about a first axis in response to user manipulation of a physical element of the input device;
   a first laser positioned to shine a first beam onto a surface of the member and to receive a reflection of at least a portion of the first beam from the surface, the first laser being positioned so that portions of the surface struck by the first beam have a velocity component parallel to the first beam as the member rotates;

a first photosensitive element providing an output signal in response to illumination, the first photosensitive element positioned to measure intensity of the first beam;

a divider configured to reduce a frequency of the first photosensitive element output signal;

a modulator configured to modulate bias current of the first laser in response to a signal from the divider;

a first controller receiving a signal based on the first photosensitive element output signal, wherein the first controller is configured to determine rotational movement of the member about the first axis in two directions based on fluctuations in the first beam intensity resulting from the received reflection, and wherein the first controller is configured to determine the direction in which the member is rotating based on fluctuations in the first beam intensity resulting from the received reflection; and a second controller configured to convert data from the determined rotational movement into data for transmission from the input device.

2. The input device of claim 1, wherein
the first controller is configured to determine rotational movement based on a Doppler shift in the first beam.

3. The input device of claim 1, wherein the first controller and the second controller are the same controller.

4. The input device of claim 1, wherein the first photosensitive element output signal is an asymmetric waveform when the member rotates, and wherein the first controller is configured to determine the rotation direction based on the shape of the waveform.

5. The input device of claim 1, wherein the member is a disk and the surface is a surface of the disk, and wherein the first laser is positioned to shine the first beam at a non-perpendicular and non-parallel angle to the disk surface and at a point on the surface displaced from the disk center.

6. A computer mouse comprising:

a housing forming an outer surface of the mouse, the housing having a flattened portion slidable across a supporting surface and an upper portion sized for grasping by a user hand;

a component for tracking movement of the mouse across the supporting surface;

a rotatable member coupled to the mouse;

a laser positioned to shine a beam onto an illumination surface of the member and to receive a reflection of at least a portion of that beam from the illumination surface;

a photosensitive element providing an output signal, the photosensitive element positioned to measure intensity of the beam;

a controller receiving a signal based on the photosensitive element output signal, wherein the controller is configured to determine rotational movement of the member based on fluctuations in the beam intensity caused by the received reflection;

an analog phased lock loop (PLL) configured to remove noise in the photosensitive element output signal, the PLL including a frequency downconversion stage;

a zero point control configured to detect values of the photosensitive element output signal indicating the member is not rotating;

a switch configured to disable determination of rotational movement in response to a signal from the zero point control;

a divider configured to reduce a frequency of the photosensitive element output signal;

a modulator configured to modulate bias current of the laser in response to a signal from the divider; and a counter configured to measure a time corresponding to a predetermined number of cycles of the photosensitive element output signal.

7. The computer mouse of claim 6, wherein
the laser is positioned so that portions of the illumination surface struck by the beam have a velocity component parallel to the beam as the member rotates, and
the controller is configured to determine rotational movement based on a Doppler shift in the beam.

8. The computer mouse of claim 7, wherein the member is rotatable about an axis in two directions, and wherein the controller is configured to determine the direction in which the member is rotating.

9. The computer mouse of claim 7, wherein the member is a scroll wheel.

* * * * *